(12) United States Patent
Sun

(10) Patent No.: US 11,025,619 B2
(45) Date of Patent: *Jun. 1, 2021

(54) BIOMETRIC IDENTITY REGISTRATION AND AUTHENTICATION

(71) Applicant: Advanced New Technologies Co., Ltd., Grand Cayman (KY)

(72) Inventor: Yuanbo Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 292 days.

This patent is subject to a terminal disclaimer.

(21) Appl. No.: 16/135,835

(22) Filed: Sep. 19, 2018

(65) Prior Publication Data

US 2019/0036917 A1 Jan. 31, 2019

Related U.S. Application Data

(63) Continuation of application No. PCT/CN2017/077686, filed on Mar. 22, 2017.

(30) Foreign Application Priority Data

Mar. 30, 2016 (CN) .......................... 201610192200.0

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *H04L 9/006* (2013.01);
(Continued)

(58) Field of Classification Search
CPC ... H04L 63/0861; H04L 9/006; H04L 9/0825; H04L 9/32; H04L 9/3213; H04L 9/3231;
(Continued)

(56) References Cited

U.S. PATENT DOCUMENTS

| 7,427,024 B1* | 9/2008 | Gazdzinski | ............ | G06Q 10/08 |
| | | | | 235/384 |
| 8,159,328 B2* | 4/2012 | Luckhardt | .............. | G07C 9/257 |
| | | | | 340/5.82 |

(Continued)

FOREIGN PATENT DOCUMENTS

| CN | 102664885 | 9/2012 |
| CN | 103067390 | 4/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Shahriar Zarrineh
(74) *Attorney, Agent, or Firm* — Fish & Richardson P.C.

(57) ABSTRACT

An authentication information request packet of user equipment is received at an authentication server. The authentication information request packet includes a device identity of the user equipment. A virtual account identity corresponding to the device identity is obtained. The authentication information response packet is signed using a server private key. An authentication request packet of the user equipment is received. The authentication request packet includes the device identifier, the virtual account identity, and a biometric feature token. A registered service public key and a registered biometric feature token corresponding to the device identifier, the virtual account identity, and a biometric authentication type are obtained. A signature verification is performed by the authentication server on the authentication request packet using the registered service public key. An identity authentication is performed based on the biometric (Continued)

feature token in the authentication request packet and the registered biometric feature token.

17 Claims, 14 Drawing Sheets

(51) Int. Cl.
  *H04L 9/32* (2006.01)
  *H04L 9/00* (2006.01)
  *H04L 9/08* (2006.01)
(52) U.S. Cl.
  CPC .............. *H04L 9/0825* (2013.01); *H04L 9/32* (2013.01); *H04L 9/3213* (2013.01); *H04L 9/3231* (2013.01); *H04L 9/3234* (2013.01); *H04L 9/3247* (2013.01); *H04L 9/3263* (2013.01); *H04L 29/06* (2013.01); *H04L 63/0876* (2013.01); *H04L 63/12* (2013.01)
(58) Field of Classification Search
  CPC ... H04L 9/3234; H04L 9/3247; H04L 9/3263; H04L 29/06; H04L 63/0876; H04L 63/12; G06F 21/32
  USPC .......................................................... 713/186
  See application file for complete search history.

(56) References Cited

U.S. PATENT DOCUMENTS

| | | | | |
|---|---|---|---|---|
| 8,438,227 | B2* | 5/2013 | Mo | G06F 16/958 709/206 |
| 8,739,260 | B1* | 5/2014 | Damm-Goossens | H04L 9/0891 726/7 |
| 8,994,498 | B2* | 3/2015 | Agrafioti | H04W 12/0608 340/5.82 |
| 9,118,656 | B2* | 8/2015 | Ting | H04L 63/104 |
| 9,146,786 | B2* | 9/2015 | Lin | G06F 9/54 |
| 9,208,492 | B2* | 12/2015 | Hoyos | G06K 9/46 |
| 9,996,684 | B2* | 6/2018 | Hoyos | H04L 63/10 |
| 2002/0157090 | A1* | 10/2002 | Anton, Jr. | G06F 8/65 717/178 |
| 2004/0034776 | A1* | 2/2004 | Fernando | H04L 9/0825 713/171 |
| 2004/0059924 | A1* | 3/2004 | Soto | G06F 21/32 713/186 |
| 2005/0055552 | A1* | 3/2005 | Shigeeda | H04L 63/0442 713/171 |
| 2007/0061590 | A1* | 3/2007 | Boye | H04L 63/083 713/186 |
| 2007/0106895 | A1* | 5/2007 | Huang | H04L 9/0866 713/170 |
| 2007/0198435 | A1* | 8/2007 | Siegal | G06F 21/32 705/67 |
| 2007/0220274 | A1 | 9/2007 | Jensen et al. | |
| 2008/0086771 | A1* | 4/2008 | Li | H04L 9/3234 726/20 |
| 2008/0120698 | A1* | 5/2008 | Ramia | H04L 63/08 726/4 |
| 2008/0120707 | A1* | 5/2008 | Ramia | H04L 63/0861 726/5 |
| 2008/0289020 | A1* | 11/2008 | Cameron | H04L 9/3213 726/9 |
| 2009/0193507 | A1* | 7/2009 | Ibrahim | H04W 12/06 726/9 |
| 2010/0217975 | A1* | 8/2010 | Grajek | G06F 21/445 713/157 |
| 2011/0202988 | A1* | 8/2011 | Otranen | H04L 63/0815 726/8 |
| 2012/0019379 | A1* | 1/2012 | Ben Ayed | G08B 13/1436 340/539.1 |
| 2013/0124855 | A1* | 5/2013 | Varadarajan | G06Q 20/3276 713/155 |
| 2013/0173915 | A1* | 7/2013 | Haulund | H04L 9/3226 713/159 |
| 2013/0179681 | A1* | 7/2013 | Benson | G06Q 20/38215 713/155 |
| 2013/0262857 | A1* | 10/2013 | Neuman | H04L 63/083 713/155 |
| 2013/0262873 | A1* | 10/2013 | Read | H04W 12/06 713/186 |
| 2013/0318359 | A1 | 11/2013 | Partnet Inc | |
| 2014/0040628 | A1* | 2/2014 | Fort | G06F 21/34 713/182 |
| 2014/0136419 | A1* | 5/2014 | Kiyohara | G06Q 20/3221 705/67 |
| 2014/0214673 | A1* | 7/2014 | Baca | G06Q 20/363 705/44 |
| 2014/0282961 | A1* | 9/2014 | Dorfman | H04L 63/0823 726/7 |
| 2014/0289833 | A1* | 9/2014 | Briceno | H04L 63/08 726/7 |
| 2015/0089673 | A1* | 3/2015 | Beckman | G06F 21/10 726/29 |
| 2015/0180869 | A1* | 6/2015 | Verma | H04L 63/0838 726/4 |
| 2015/0200935 | A1 | 7/2015 | Ikeda et al. | |
| 2015/0249540 | A1* | 9/2015 | Khalil | H04L 63/0853 713/158 |
| 2015/0365403 | A1* | 12/2015 | Counterman | H04L 63/0876 726/9 |
| 2016/0026776 | A1* | 1/2016 | Hurst | G06F 21/602 713/165 |
| 2016/0234286 | A1* | 8/2016 | Fausak | H04L 12/4679 |
| 2016/0248742 | A1* | 8/2016 | Baghdasaryan | H04L 63/0884 |
| 2017/0034164 | A1* | 2/2017 | Khalil | H04L 63/0876 |
| 2017/0093846 | A1* | 3/2017 | Lopez Lecube | H04L 63/0853 |
| 2017/0171199 | A1* | 6/2017 | Bao | H04L 63/0838 |
| 2017/0171200 | A1* | 6/2017 | Bao | H04L 63/083 |
| 2018/0181739 | A1* | 6/2018 | Zhong | H04L 9/3231 |
| 2020/0143382 | A1* | 5/2020 | Krob | H04L 9/0866 |

FOREIGN PATENT DOCUMENTS

| | | |
|---|---|---|
| CN | 103346888 | 10/2013 |
| JP | 2005115583 | 4/2005 |
| JP | 2007172507 | 7/2007 |
| JP | 2008092413 | 4/2008 |
| KR | 20060063590 | 6/2006 |
| KR | 20070062394 | 6/2007 |
| RU | 2434340 | 11/2011 |
| WO | WO 2004006076 | 1/2004 |
| WO | WO 2007094165 | 8/2007 |
| WO | WO 2016019089 | 2/2016 |

OTHER PUBLICATIONS

Extended European Search Report in European Application No. 17773123.9, dated Aug. 2, 2019, 8 pages.
Nakamoto, "Bitcoin: A Peer-to-Peer Electronic Cash System," www.bitcoin.org, 2005, 9 pages.
International Search Report by the International Searching Authority issued in International Application No, PCT/CN2017/077686 dated Jun. 16, 2017; 8 pages.
PCT International Preliminary Report on Patentability in International Application No. PCT/CN2017/077686, dated Oct. 2, 2018, 10 pages (with English translation).

* cited by examiner

A service client sends a device information request to biometric authentication middleware, the biometric authentication middleware forwards the device information request to a biometric authentication client, the biometric authentication client forwards the device information request to an identity authentication detector, the identity authentication detector obtains device information of user equipment that includes a device identity and returns a device information response that includes the device information to the biometric authentication client, the biometric authentication client returns the device information response to the biometric authentication middleware, and the biometric authentication middleware returns the device information response to the service client ⟶ 210

↓

The service client sends a registration information request packet including a service account identity to a service server, and receives a registration information response packet returned by the service server, where the registration information response packet is signed by an authentication server by using a server private key and then sent to the service server, and includes a server public key corresponding to the server private key and a virtual account identity corresponding to the service account identity and generated by the authentication server after receiving the registration information request packet forwarded by the service server ⟶ 220

↓

The service client determines a biometric authentication type of the user, obtains biometric data of the user of the biometric authentication type, and sends a local biometric authentication request that includes the biometric data to the biometric authentication middleware; the biometric authentication middleware forwards the local biometric authentication request to the biometric authentication client; the biometric authentication client performs biometric feature verification on the user identity by using the biometric data and returns a local biometric authentication response that includes a verification result to the biometric authentication middleware; and the biometric authentication middleware returns the local biometric authentication response to the service client ⟶ 230

↓

When the local biometric feature verification result is a success, the service client sends the registration information response packet to the biometric authentication middleware, and the biometric authentication middleware forwards the registration information response packet to the biometric authentication client; the biometric authentication client forwards the registration information response packet to the identity authentication detector, and the identity authentication detector performs signature verification on the registration information response packet by using the server public key, and obtains a biometric feature token corresponding to biometric data used by the user during the latest successful local biometric verification from the token and key manager after signature verification succeeds, to generate a corresponding service public key and service private key, and saves a correspondence among the virtual account identity, the biometric authentication type, a biometric authentication token, and the service private key; the identity authentication detector encapsulates the device identity, the virtual account identity, the biometric authentication type, the biometric feature token, and the service public key into a registration request packet, and returns the registration request packet to the biometric authentication client after the token and key manager signs the registration request packet by using a device private key of the user equipment; and the biometric authentication client returns the registration request packet to the biometric authentication middleware, and the biometric authentication middleware returns the registration request packet to the service client ⟶ 240

↓

The service client sends the registration request packet to the service server, and the service server forwards the registration request packet to the authentication server, so after a biometric authentication center server performs signature verification on the registration request packet by using a device public key of the user equipment, the authentication server saves a correspondence among the device identity, the virtual account identity, the biometric authentication type, the biometric feature token, and the service public key ⟶ 250

FIG. 2

BIOMETRIC IDENTITY REGISTRATION AND AUTHENTICATION

CROSS-REFERENCE TO RELATED APPLICATIONS

This application is a continuation of PCT Application No. PCT/CN2017/077686, filed on Mar. 22, 2017, which claims priority to Chinese Patent Application No. 201610192200.0, filed on Mar. 30, 2016, and each application is hereby incorporated by reference in its entirety.

TECHNICAL FIELD

The present application relates to the field of network communications technologies, and in particular, to a method and device for registering a biometric identity, and a method and device for authenticating a biometric identity.

BACKGROUND

With the development of biometric identification technologies, it is possible to authenticate personal identities by using a combination of computers and optics, acoustics, biosensors, and biostatistics, and by using physiological features of the human body such as fingerprint, face, iris, and voice.

The rapid development of the mobile Internet provides new application platforms for the biometric identification technologies. For example, a fingerprint and face can be used to log in to an account for payments on user equipment, without a need to memorize and enter a password. Because biometric identification is more likely to be used for identity authentication on mobile payment applications, security becomes the most important factor that needs to be considered at first during registration and authentication.

SUMMARY

In view of this, the present application provides a method for registering a biometric identity, applied to user equipment, where a service client, biometric authentication middleware, a biometric authentication client, an identity authentication detector, and a token and key manager run on the user equipment, and the method includes the following:

The service client sends a device information request to the biometric authentication middleware, the biometric authentication middleware forwards the device information request to the biometric authentication client, the biometric authentication client forwards the device information request to the identity authentication detector, the identity authentication detector obtains device information of the user equipment that includes a device identity and returns a device information response that includes the device information to the biometric authentication client, the biometric authentication client returns the device information response to the biometric authentication middleware, and the biometric authentication middleware returns the device information response to the service client.

The service client sends a registration information request packet including a service account identity to a service server, and receives a registration information response packet returned by the service server, where the registration information response packet is signed by an authentication server by using a server private key and then sent to the service server, and includes a server public key corresponding to the server private key and a virtual account identity corresponding to the service account identity and generated by the authentication server after receiving the registration information request packet forwarded by the service server.

The service client determines a biometric authentication type of a user, obtains the user's biometric data of the biometric authentication type, and sends a local biometric authentication request that includes the biometric data to the biometric authentication middleware; the biometric authentication middleware forwards the local biometric authentication request to the biometric authentication client; the biometric authentication client performs biometric feature verification on the user identity by using the biometric data and returns a local biometric authentication response that includes a verification result to the biometric authentication middleware; and the biometric authentication middleware returns the local biometric authentication response to the service client.

When the local biometric feature verification result is a success, the service client sends the registration information response packet to the biometric authentication middleware, and the biometric authentication middleware forwards the registration information response packet to the biometric authentication client; the biometric authentication client forwards the registration information response packet to the identity authentication detector; and the identity authentication detector performs signature verification on the registration information response packet by using the server public key, and obtains a biometric feature token corresponding to biometric data used by the user during the latest successful local biometric verification from the token and key manager after signature verification succeeds, to generate a corresponding service public key and service private key, and saves a correspondence among the virtual account identity, the biometric authentication type, a biometric authentication token, and the service private key; the identity authentication detector encapsulates the device identity, the virtual account identity, the biometric authentication type, the biometric feature token, and the service public key into a registration request packet, and returns the registration request packet to the biometric authentication client after the token and key manager signs the registration request packet by using a device private key of the user equipment; and the biometric authentication client returns the registration request packet to the biometric authentication middleware, and the biometric authentication middleware returns the registration request packet to the service client.

The service client sends the registration request packet to the service server, and the service server forwards the registration request packet to the authentication server, so after a biometric authentication center server performs signature verification on the registration request packet by using a device public key of the user equipment, the authentication server saves a correspondence among the device identity, the virtual account identity, the biometric authentication type, the biometric feature token, and the service public key, to perform identity authentication on the account.

The present application provides a method for registering a biometric identity, applied to an authentication server and including:

Receiving a registration information request packet of user equipment from a service server, where the registration information request packet includes a service account identity; generating a virtual account identity corresponding to the service account identity, encapsulating the virtual account identity and a server public key into a registration information response packet, and sending the registration information response packet to the service server after signing the registration information response packet by using a server private key corresponding to the server public key, so the service server forwards the registration information response packet to the user equipment.

Receiving a registration request packet of the user equipment from the service server, where the registration request packet includes a device identity of the user equipment, the virtual account identity, a biometric authentication type, a biometric feature token, and a service public key, and wherein the registration request packet has been signed using a device encryption key of the user equipment; and sending the registration request packet to a biometric authentication center server, and receiving a signature verification result returned by the biometric authentication center server after performing signature verification on the registration request packet by using a device public key corresponding to the device identity.

After signature verification on the registration request packet succeeds, saving a correspondence among the device identity, the virtual account identity, the biometric authentication type, the biometric feature token, and the service public key, to perform identity authentication on the account.

The present application provides a method for authenticating a biometric identity, applied to user equipment, where a service client, biometric authentication middleware, a biometric authentication client, an identity authentication detector, and a token and key manager run on the user equipment, and the method includes the following:

The service client sends a device information request to the biometric authentication middleware, the biometric authentication middleware forwards the device information request to the biometric authentication client, the biometric authentication client forwards the device information request to the identity authentication detector, the identity authentication detector obtains device information of the user equipment that includes a device identity and returns a device information response that includes the device information to the biometric authentication client, the biometric authentication client returns the device information response to the biometric authentication middleware, and the biometric authentication middleware returns the device information response to the service client.

The service client sends an authentication information request packet including the device identity to a service server, and receives an authentication information response packet returned by the service server, where the authentication information response packet is signed by an authentication server by using a server private key and then sent to the service server, and includes a server public key corresponding to the server private key and a virtual account identity corresponding to the device identity and obtained by the authentication server after receiving the authentication information request packet forwarded by the service server.

The service client obtains biometric data of a biometric authentication type used by a user during registration, and sends a local biometric authentication request that includes the biometric data to the biometric authentication middleware; the biometric authentication middleware forwards the local biometric authentication request to the biometric authentication client; the biometric authentication client performs biometric feature verification on the user identity by using the biometric data, and returns a local biometric authentication response that includes a verification result to the biometric authentication middleware; and the biometric authentication middleware returns the local biometric authentication response to the service client.

When the local biometric feature verification result is a success, the service client sends the authentication information response packet to the biometric authentication middleware, and the biometric authentication middleware forwards the authentication information response packet to the biometric authentication client; the biometric authentication client forwards the authentication information response packet to the identity authentication detector; the identity authentication detector performs signature verification on the authentication information response packet by using the server public key, obtains a biometric feature token corresponding to biometric data used by the user in the latest successful local biometric verification from the token and key manager after signature verification succeeds, obtains a service private key corresponding to the biometric authentication type, the virtual account identity in the authentication information response packet, and the biometric feature token from a stored correspondence among the virtual account identity, the biometric authentication type, the biometric feature token, and the service private key, encapsulates the device identity, the virtual account identity, the biometric authentication type, and the biometric feature token into an authentication request packet, and returns the authentication request packet to the biometric authentication client after signing the authentication request packet by using the service private key; the biometric authentication client returns the authentication request packet to the biometric authentication middleware, and the biometric authentication middleware returns the authentication request packet to the service client.

The service client sends the authentication request packet to the service server, so the service server forwards the authentication request packet to the authentication server, and the authentication server performs identity authentication on the user based on a registered service public key and a registered biometric feature token corresponding to the virtual account identity, the device identity, and the biometric authentication type.

The present application provides a method for authenticating a biometric identity, applied to an authentication server and including the following:

Receiving an authentication information request packet of user equipment from a service server, where the authentication information request packet includes a device identity of the user equipment; obtaining a virtual account identity corresponding to the device identity, encapsulating the virtual account identity and a server public key into an authentication information response packet, and sending the authentication information response packet to the service server after signing the authentication information response packet by using a server private key corresponding to the server public key, so the service server forwards the authentication information response packet to the user equipment.

Receiving an authentication request packet of the user equipment from the service server, and signing the authentication request packet by using a service public key, where the authentication request packet includes the device identifier of the user equipment, the virtual account identity, a biometric authentication type, and a biometric feature token; and obtaining a registered service public key and a registered biometric feature token corresponding to the device identity, the virtual account identity, and the biometric authentication type that are in the authentication request packet.

Performing signature verification on the authentication request packet by using the registered service public key, and performing identity authentication on the user based on the biometric feature token in the authentication request packet and the registered biometric feature token.

The present application further provides a device for registering a biometric identity, applied to user equipment and including the following:

A service client, configured to send a device information request to biometric authentication middleware, and receive a device information response including a device identity and returned by the biometric authentication middleware; send a registration information request packet that includes a service account identity to a service server, and receive a registration information response packet returned by the service server, where the registration information response packet is signed by an authentication server by using a server private key and then sent to the service server, and includes a virtual account identity corresponding to the service account identity and generated by the authentication server after receiving the registration information request packet forwarded by the service server, and a server public key corresponding to the server private key; determine a biometric authentication type of the user, obtain the user's biometric data of the biometric authentication type, and send a local biometric authentication request that includes the biometric data to the biometric authentication middleware, and receive a local biometric authentication response including a local biometric verification result and returned by the biometric authentication middleware; when the local biometric feature verification result is a success, send the registration information response packet to the biometric authentication middleware, receive a registration request packet returned by the biometric authentication middleware, and sign the registration request packet by using a device private key of the user equipment, where the registration request packet includes the device identity, the virtual account identity, the biometric authentication type, a biometric feature token, and a service public key; send the registration request packet to the service server, so the service server forwards the registration request packet to the authentication server, and after a biometric authentication center server performs signature verification on the registration request packet by using a device public key of the user equipment, the authentication server saves a correspondence among the device identity, the virtual account identity, the biometric feature type, the biometric feature token, and the service public key, to perform identity authentication on the account.

The biometric authentication middleware, configured to receive a device information request from the service client, forward the device information request to a biometric authentication client, receive a device information response from the biometric authentication client, and forward the device information response to the service client; receive a local biometric authentication request from the service client, forward the local biometric authentication request to the biometric authentication client, receive a local biometric authentication response from the biometric authentication client, and forward the local biometric authentication response to the service client; and receive a registration information response packet from the service client, and forward the registration information response packet to the biometric authentication client, receive a registration request packet from the biometric authentication client, and forward the registration request packet to the service client.

The biometric authentication client, configured to receive a device information request from the biometric authentication middleware, forward the device information request to an identity authentication detector, receive a device information response from the identity authentication detector, and forward the device information response to the biometric authentication middleware; receive a local biometric authentication request form the biometric authentication middleware, perform biometric feature verification on the user identity by using biometric data in the local biometric authentication request, and return a local biometric authentication response that includes a verification result to the biometric authentication middleware; and receive a registration information response packet from the biometric authentication middleware, forward the registration information response packet to the identity authentication detector, receive a registration request packet from the identity authentication detector, and forward the registration request packet to the biometric authentication middleware.

The identity authentication detector, configured to obtain device information of the user equipment that includes the device identity after receiving a device information request forwarded by the biometric authentication client, and return a device information response that includes the device information to the biometric authentication client; after receiving a registration information response packet forwarded by the biometric authentication client, perform signature verification on the registration information response packet by using a server public key in the registration information response packet, obtain a biometric feature token corresponding to biometric data used by the user in the latest successful local biometric verification from a token and key manager after signature verification succeeds, generate a corresponding service public key and service private key, save a correspondence among the virtual account identity, the biometric authentication type, a biometric authentication token, and the service private key, encapsulate the device identity, the virtual account identity, the biometric authentication type, the biometric feature token, and the service public key into a registration request packet, and returns the registration request packet to the biometric authentication client after the token and key manager signs the registration request packet by using the device private key of the user equipment.

The token and key manager, configured to provide the identity authentication detector with the biometric feature token corresponding to the biometric data used by the user during the latest successful local biometric verification; and after receiving a registration request packet from the identity authentication detector, sign the registration request packet by using the stored device private key of the user equipment and then return the registration request packet to the identity authentication detector.

The present application provides a device for registering a biometric identity, applied to an authentication server and including:

A registration information response unit, configured to receive a registration information request packet of user equipment from a service server, where the registration information request packet includes a service account identity, generate a virtual account identity corresponding to the service account identity, encapsulate the virtual account identity and a server public key into a registration information response packet, and send the registration information response packet to the service server after signing the registration information response packet by using a server private key corresponding to the server public key, so the service server forwards the registration information response packet to the user equipment.

A registration request receiving unit, configured to receive a registration request packet of the user equipment from the service server, where the registration request packet includes a device identity of the user equipment, the virtual account identity, a biometric authentication type, a biometric feature token, and a service public key, and wherein the registration request packet has been signed using a device encryption key of the user equipment; and send the registration request packet to a biometric authentication center server, and receive a signature verification result returned by the biometric authentication center server after performing signature verification on the registration request packet by using a device public key corresponding to the device identity.

A registration information storage unit, configured to save a correspondence among the device identity, the virtual account identity, the biometric authentication type, the biometric feature token, and the service public key after signature verification on the registration request packet succeeds, to perform identity authentication on the account.

The present application provides a device for authenticating a biometric identity, applied to user equipment and including:

A service client, configured to send a device information request to biometric authentication middleware, and receive a device information response including a device identity and returned by the biometric authentication middleware; send an authentication information request packet that includes the device identity to a service server, and receive an authentication information response packet returned by the service server, where the authentication information response packet is signed by an authentication server by using a server private key and then sent to the service server, and includes a server public key corresponding to the server private key and a virtual account identity corresponding to the device identity and obtained by the authentication server after receiving the authentication information request packet forwarded by the service server; obtain biometric data of a biometric authentication type used by a user during registration, send a local biometric authentication request that includes the biometric data to the biometric authentication middleware, and receive a local biometric authentication response including a local biometric verification result and returned by the biometric authentication middleware; when the local biometric feature verification result is a success, send the authentication information response packet to the biometric authentication middleware, receive an authentication request packet returned by the biometric authentication middleware, and sign the authentication request packet by using a service private key, where the authentication request packet includes the device identity, the virtual account identity, the biometric authentication type, and a biometric feature token; send the authentication request packet to the service server, so the service server forwards the authentication request packet to the authentication server, and the authentication server performs identity authentication on the user based on a registered service public key and a registered biometric feature token corresponding to the virtual account identity, the device identity, and the biometric authentication type.

The biometric authentication middleware, configured to receive a device information request from the service client, forward the device information request to a biometric authentication client, receive a device information response from the biometric authentication client, and forward the device information response to the service client; receive a local biometric authentication request from the service client, forward the local biometric authentication request to the biometric authentication client, receive a local biometric authentication response from the biometric authentication client, and forward the local biometric authentication response to the service client; and receive an authentication information response packet from the service client, forward the authentication information response packet to the biometric authentication client, receive an authentication request packet from the biometric authentication client, and forward the authentication request packet to the service client.

The biometric authentication client, configured to receive a device information request from the biometric authentication middleware, forward the device information request to an identity authentication detector, receive a device information response from the identity authentication detector, and forward the device information response to the biometric authentication middleware; receive a local biometric authentication request form the biometric authentication middleware, perform biometric feature verification on the user identity by using biometric data in the local biometric authentication request, and return a local biometric authentication response that includes a verification result to the biometric authentication middleware; and receive an authentication information response packet from the biometric authentication middleware, forward the authentication information response packet to the identity authentication detector, receive an authentication request packet from the identity authentication detector, and forward the authentication request packet to the biometric authentication middleware.

The identity authentication detector, configured to obtain device information of the user equipment that includes the device identity after receiving a device information request forwarded by the biometric authentication client, and return a device information response that includes the device information to the biometric authentication client; after receiving an authentication information response packet forwarded by the biometric authentication client, perform signature verification on the authentication information response packet by using a server public key in the authentication information response packet, obtain a biometric feature token corresponding to biometric data used by the user during the latest successful local biometric verification from a token and key manager after signature verification succeeds, obtain a service private key corresponding to the biometric authentication type, the virtual account identity in the authentication information response packet, and the biometric feature token from a stored correspondence among the virtual account identity, the biometric authentication type, the biometric feature token, and the service private key, encapsulate the device identity, the virtual account identity, the biometric authentication type, and the biometric feature token into an authentication request packet, and return the authentication request packet to the biometric authentication client after signing the authentication request packet by using the service private key.

The token and key manager, configured to provide the identity authentication detector with the biometric feature token corresponding to the biometric data used by the user during the latest successful local biometric verification.

The present application provides a device for authenticating a biometric identity, applied to an authentication server and including:

An authentication information response unit, configured to receive an authentication information request packet of user equipment from a service server, where the authentication information request packet includes a device identity of the user equipment; obtain a virtual account identity corresponding to the device identity, encapsulate the virtual account identity and a server public key into an authentication information response packet, and send the authentication information response packet to the service server after signing the authentication information response packet by using a server private key corresponding to the server public key, so the service server forwards the authentication information response packet to the user equipment.

An authentication request receiving unit, configured to receive an authentication request packet of the user equipment from the service server, and sign the authentication request packet by using a service public key, where the authentication request packet includes the device identifier of the user equipment, the virtual account identity, a biometric authentication type, and a biometric feature token; and obtaining a registered biometric feature token and a registered service public key corresponding to the device identity, the virtual account identity, and the biometric authentication type that are in the authentication request packet.

A signature verification and authentication unit, configured to perform signature verification on the authentication request packet by using the registered service public key, and perform identity authentication on the user based on the biometric feature token in the authentication request packet and the registered biometric feature token.

It can be seen from the previous technical solutions that in the implementations of the present application, during identity registration, the server public key and the server private key are used to verify the service server. The device private key pre-stored on the user equipment and the device public key pre-stored on the server are used to verify whether the user equipment is reliable, so the user equipment can securely register the correspondence among the device identity, the virtual account identity, the biometric authentication type, the biometric feature token, and the service public key into the authentication server, thereby improving identity registration security. During identity authentication, the server public key and the server private key are used to verify the service server, the service private key and the registered service public key are used to verify the user equipment, and the user equipment needs to provide a device identity, a virtual account identity, a biometric authentication type, and a biometric feature token matching the registered information to pass authentication, greatly improving identity authentication security.

BRIEF DESCRIPTION OF DRAWINGS

FIG. 2 is a flowchart illustrating a method for registering a biometric identity that applies to user equipment, according to Implementation 1 of the present application;

DESCRIPTION OF IMPLEMENTATIONS

In a biometric identification application based on user equipment, biometric data of a user is collected by the user equipment, and biometric identification can be performed on the user equipment or a server. Because a large amount of traffic is usually consumed when image or video data is uploaded to the server, biometric identification is completed on the user equipment in implementations of the present application.

Figure 1:
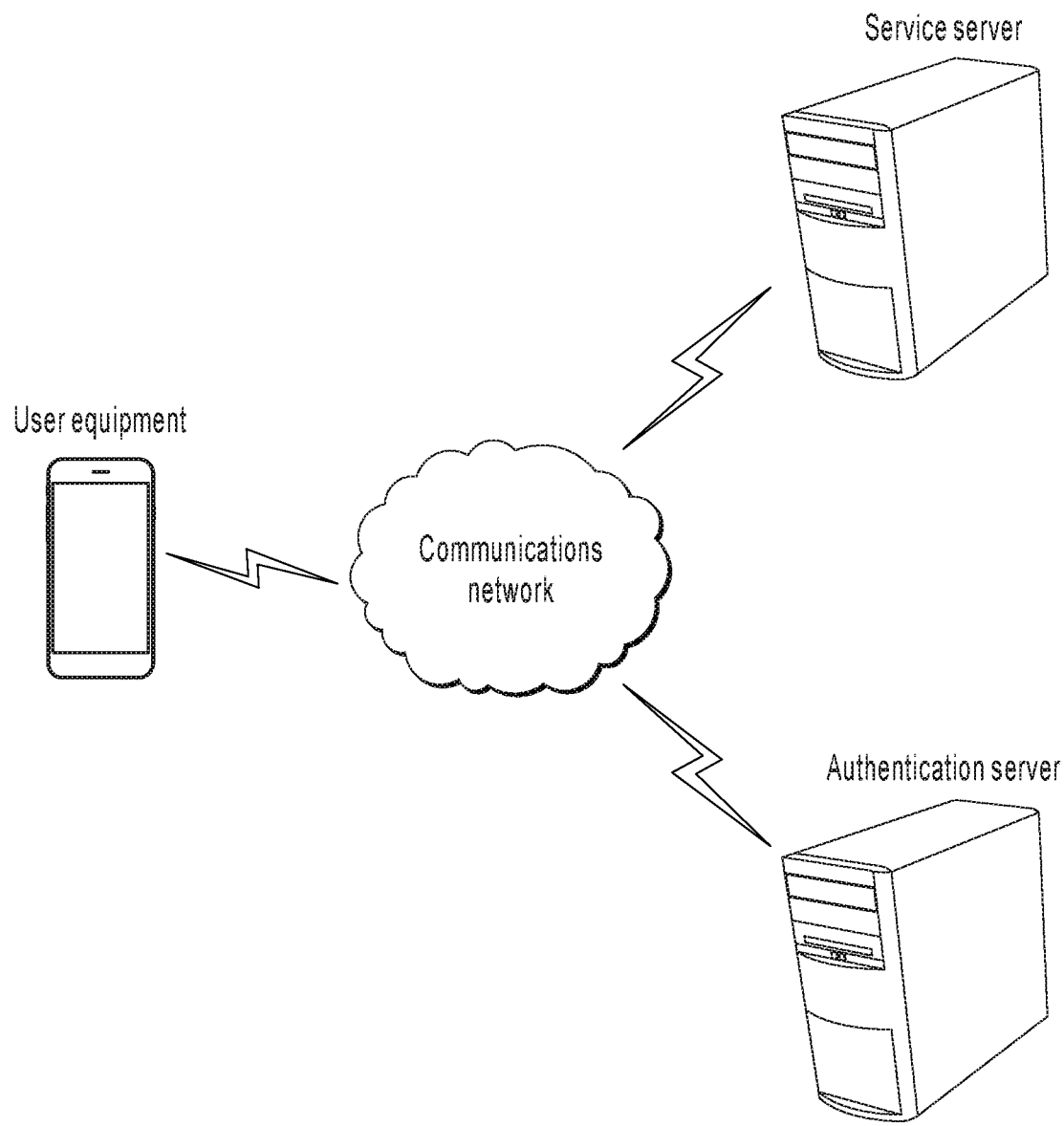
FIG. 1 is a diagram illustrating a network structure of an application scenario, according to an implementation of the present application.

A network structure of an application scenario of an implementation of the present application is shown in FIG. 1. User equipment and a service server, and the service server and an authentication server can access each other by using a communications network. The user equipment is a terminal device having a biometric feature identification function, and can be a device such as a mobile phone, a tablet computer, a personal computer (PC), or a notebook. The service server is used to receive a service request (including registration and authentication requests) initiated by a user using the user equipment, and send a corresponding response to the user equipment. The authentication server is used to authenticate a user account identity. The service server or the authentication server can be a physical or logical server, or two or more physical or logical servers that have different responsibilities cooperate to implement functions of the service server or the authentication server in the implementation of the present application. In the implementation of the present application, types of the user equipment, the service server, and the authentication server, and types or protocols of the communications networks between the user equipment and the service server, and between the service server and the authentication server are not limited.

Figure 3:
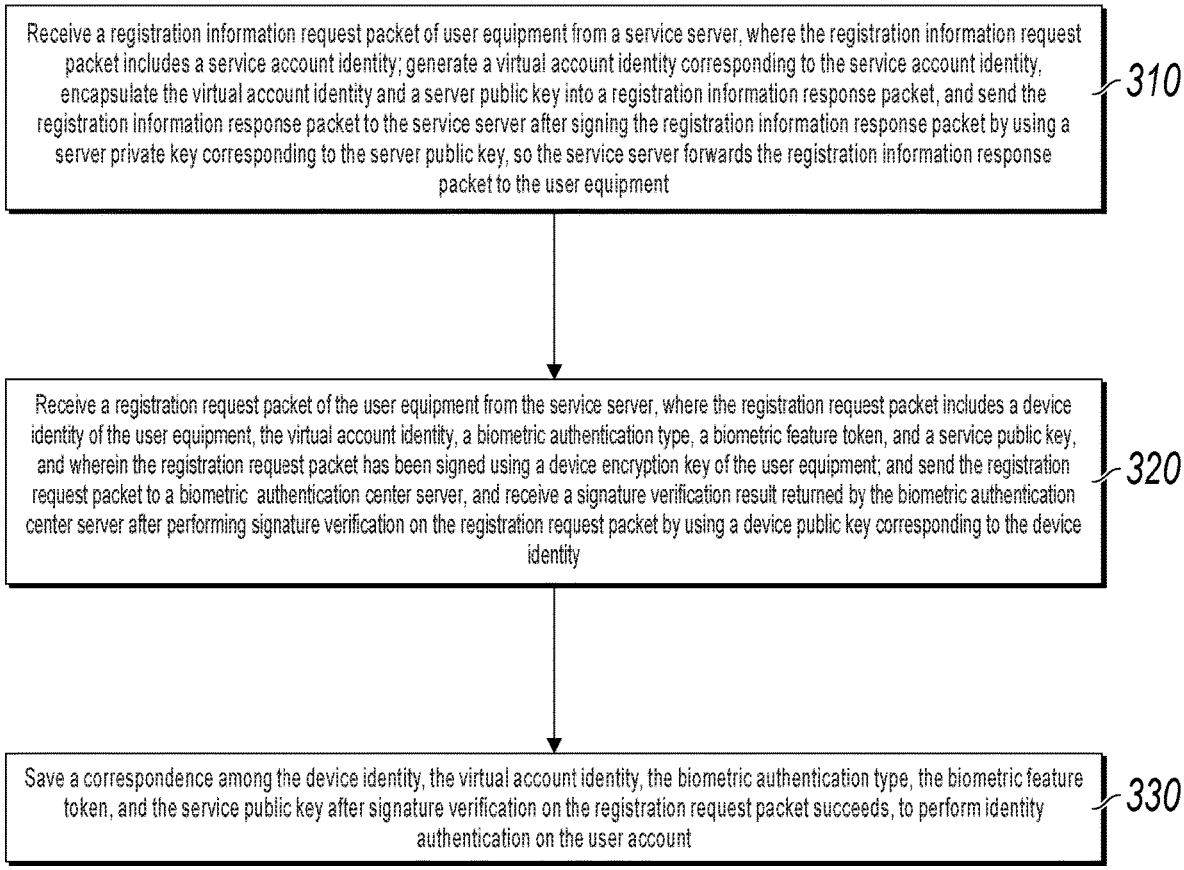
FIG. 3 is a flowchart illustrating a method for registering a biometric identity that applies to an authentication server, according to Implementation 1 of the present application.

Implementation 1 of the present application describes a method for registering a biometric identity. A process of applying the method to user equipment is shown in FIG. 2, and a process of applying the method to an authentication server is shown in FIG. 3.

In the implementation of the present application, the following modules run on the user equipment: a service client, biometric authentication middleware, a biometric authentication client, an identity authentication detector, and a token and key manager. The function modules can be separate software, a component of separate software, or a combination of software and hardware. Detailed implementations are not limited in the implementation of the present application.

In the implementation of the present application, the user equipment stores a device private key, which is stored and used by the token and key manager. A biometric authentication center server can obtain a correspondence between a device identity of the user equipment and a device public key of the user equipment locally or from another accessible network storage location. A device private key of user equipment is corresponding to its device public key. The authentication server can access the biometric authentication center server by using a network. The device private key can be pre-stored on the user equipment before factory delivery; or the user equipment, the biometric authentication center server, or another network node generates a device private key and a corresponding device public key, and separately sends them to the user equipment and the biometric authentication center server for storage. This is not limited in the implementation of the present application.

On the user equipment, in step 210, the service client sends a device information request to the biometric authentication middleware, the biometric authentication middleware forwards the device information request to the biometric authentication client, the biometric authentication client forwards the device information request to the identity authentication detector, the identity authentication detector obtains device information of the user equipment that includes a device identity and returns a device information response that includes the device information to the biometric authentication client, the biometric authentication client returns the device information response to the biometric authentication middleware, and the biometric authentication middleware returns the device information response to the service client.

When the user initiates a process of registering a biometric identity on the service client of the user equipment, the service client initiates a device information request to the biometric authentication middleware, the biometric authentication middleware forwards the device information request to the biometric authentication client, and the biometric authentication client forwards the device information request to the identity authentication detector.

The device information of the user equipment obtained by the identity authentication detector includes the device identity, a device model, a manufacturer, etc. A hardware identity of the user equipment can be used as the device identity, e.g. the Universally Unique Identifier (UUID), the Media Access Control (MAC) address, or the Bluetooth address of the user equipment.

The identity authentication detector returns a device information response that includes the obtained device information to the biometric authentication client, the biometric authentication client returns the device information response to the biometric authentication middleware, and the biometric authentication middleware returns the device information response to the service client.

On the user equipment, in step 220, the service client sends a registration information request packet including a service account identity to a service server, and receives a registration information response packet returned by the service server, where the registration information response packet is signed by an authentication server by using a server private key and then sent to the service server, and includes a server public key corresponding to the server private key, and a virtual account identity corresponding to the service account identity and generated by the authentication server after receiving the registration information request packet forwarded by the service server.

On the authentication server, in step 310, receive the registration information request packet of the user equipment from the service server, where the registration information request packet includes the service account identity; generate the virtual account identity corresponding to the service account identity and encapsulate the virtual account identity and the server public key into the registration information response packet, and send the registration information response packet to the service server after signing the registration information response packet by using the server private key corresponding to the server public key, so the service server forwards the registration information response packet to the user equipment.

The service client of the user equipment sends a registration information request packet to the service server, and the registration information request packet includes a service account identity. The service account identity is the unique information on the service server used for registering a user account identity. For example, the service account identity can be the name or the number of the user account in the service system. The registration information request packet can further include the device identity of the user equipment. The service server forwards the registration information request packet to the authentication server.

The authentication server can provide an authentication service for various different service systems that have their respective service accounts. To avoid that the authentication server has difficulty in differentiating between different user accounts when service account identities of the service systems are repeated, the authentication server generates a virtual account identity corresponding to the service account (namely, corresponding to the service account in the service system) after receiving the registration information request packet. The virtual account identity is uniquely corresponding to a service account of a service system in the authentication server. A method for generating the virtual account identity is not limited in the implementation of the present application. For example, a service system identity and a service account identity of the user in the service system can be used as the virtual account identity. For another example, an index of the user account of the service system registered in the database of the authentication server can be used as the virtual account identity.

It is worthwhile to note that if the method for generating the virtual account identity cannot ensure that the same virtual account identity is generated for same service accounts of the same service system, the authentication server needs to store a correspondence between a generated virtual account identity and a service account of a service system (or store a correspondence between a virtual account identity and a device identity), to allocate the same virtual account identity in the registration process to the same user account of the same service system in the subsequent identity authentication process.

The authentication server pre-stores a server private key and a corresponding server public key. After generating the virtual account identity, the authentication server encapsulates the virtual account identity and the server public key into a registration information response packet, and sends the registration information response packet to the service server after signing the registration information response packet by using the server private key. The service server forwards the registration information response packet to the service client of the user equipment.

On the user equipment, in step 230, the service client determines a biometric authentication type of the user, obtains the user's biometric data of the biometric authentication type, and sends a local biometric authentication request that includes the biometric data to the biometric authentication middleware; the biometric authentication middleware forwards the local biometric authentication request to the biometric authentication client; the biometric authentication client performs biometric feature verification on the user identity by using the biometric data and returns a local biometric authentication response that includes a verification result to the biometric authentication middleware; and the biometric authentication middleware returns the local biometric authentication response to the service client.

The service client determines a biometric authentication type used by the user during identity authentication in the service system, and requests the user to provide biometric data of this type. The service client can select one of biometric authentication types supported by the user equipment (that is, the user equipment has a biometric feature identification function) based on predetermined priority; or can present several biometric authentication types supported by the user equipment and accepted by the service system to the user for selection. This is not limited in the implementation of the present application. The biometric authentication type can be fingerprint, voice, iris, face, etc.

The user's biometric data can be any particular object that the user equipment can identify in the biometric authentication type determined by the service client. For example, the biometric data can be the fingerprint of any finger, can be the iris of any eye.

After obtaining the biometric data of the determined biometric authentication type, the service client sends a local biometric authentication request including the biometric data to the biometric authentication middleware, and the biometric authentication middleware forwards the local biometric authentication request to the biometric authentication client.

The biometric authentication client performs biometric feature verification on the user identity by using the biometric data. For a detailed method for biometric feature verification, reference can be made to the biometric feature identification method of the user equipment in the existing technologies. For example, the biometric data can be compared with locally pre-stored sample data of the user equipment; if the matching degree meets some predetermined conditions, biometric feature verification succeeds. After the verification is completed, the biometric authentication client returns a local biometric authentication response including a verification result indicating whether verification succeeds to the biometric authentication middleware, and the biometric authentication middleware returns the local biometric authentication response to the service client.

On the user equipment, in step 240, when the local biometric feature verification result is a success, the service client sends the registration information response packet to the biometric authentication middleware, and the biometric authentication middleware forwards the registration information response packet to the biometric authentication client. The biometric authentication client forwards the registration information response packet to the identity authentication detector. Moreover, the identity authentication detector performs signature verification on the registration information response packet by using the server public key, and obtains a biometric feature token corresponding to biometric data used by the user during the latest successful local biometric verification from the token and key manager after signature verification succeeds, to generate a corresponding service public key and service private key, and saves a correspondence among the virtual account identity, the biometric authentication type, a biometric authentication token, and the service private key. The identity authentication detector encapsulates the device identity, the virtual account identity, the biometric authentication type, the biometric feature token, and the service public key into a registration request packet, and returns the registration request packet to the biometric authentication client after the token and key manager signs the registration request packet by using a device private key of the user equipment. The biometric authentication client returns the registration request packet to the biometric authentication middleware, and the biometric authentication middleware returns the registration request packet to the service client.

The service client extracts the local biometric feature verification result from the local biometric authentication response returned by the biometric authentication middleware. If the result indicates a failure, the identity registration process fails. When the local biometric feature verification result indicates a success, the service client sends the registration information response packet to the biometric authentication middleware, the biometric authentication middleware forwards the registration information response packet to the biometric authentication client, and the biometric authentication client forwards the registration information response packet to the identity authentication detector.

The identity authentication detector extracts the server public key from the registration information response packet, and performs signature verification on the registration information response packet by using the server public key. If the signature verification fails, it indicates that the registration information response packet is possibly not from a reliable authentication server, and the registration process fails. After the signature verification succeeds, the identity authentication detector requests a biometric feature token from the token and key manager. The token and key manager returns the biometric feature token corresponding to the biometric data used by the user during the latest local biometric feature verification (namely, the biometric data obtained by the service client when performing local biometric feature verification in step 230) to the identity authentication detector.

The biometric feature token is a characteristic quantity or an index value of the user equipment that uniquely corresponds to sample data used for verifying the biometric data. That is, fingerprints of the user are corresponding to different biometric feature tokens, and the face is corresponding to another different biometric feature token. Each time the user uses the thumb to perform biometric feature verification, sample data of the thumb fingerprint is used to verify the thumb fingerprint data collected by the user equipment. Therefore, the thumb fingerprint data is corresponding to the same biometric feature token. The form of the biometric feature token and a detailed method for generating the biometric feature token are not limited in the present application. For example, the biometric feature token can be an information digest obtained by applying the digest algorithm to the sample data or a portion of the sample data, or can be a random number corresponding to the sample data.

The identity authentication detector generates the service public key and the service private key that are corresponding to each other, and saves the correspondence among the virtual account identity in the registration information response packet, the biometric authentication type used by the user during the latest successful local biometric verification, the biometric feature token returned by the token and key manager, and the generated service private key. The identity authentication detector encapsulates the device identity, the virtual account identity, the biometric authentication type, the biometric feature token, and the service public key into the registration request packet, and sends the registration request packet to the token and key manager. The token and key manager reads the stored device private key of the user equipment, and returns the registration request packet to the biometric authentication client after signing the registration request packet by using the device private key.

The biometric authentication client returns the registration request packet to the biometric authentication middleware, and the biometric authentication middleware returns the registration request packet to the service client.

On the user equipment, in step 250, the service client sends the registration request packet to the service server, and the service server forwards the registration request packet to the authentication server, so after a biometric authentication center server performs signature verification on the registration request packet by using a device public key of the user equipment, the authentication server saves a correspondence among the device identity, the virtual account identity, the biometric authentication type, the biometric feature token, and the service public key, to perform identity authentication on the user account.

On the authentication server, in step 320, receive the registration request packet of the user equipment from the service server, where the registration request packet includes the device identity of the user equipment, the virtual account identity, the biometric authentication type, the biometric feature token, and the service public key, and wherein the registration request packet has been signed using a device encryption key of the user equipment; and send the registration request packet to a biometric authentication center server, and receive a signature verification result returned by the biometric authentication center server after performing signature verification on the registration request packet by using a device public key corresponding to the device identity.

On the authentication server, in step 330, save a correspondence among the device identity, the virtual account identity, the biometric authentication type, the biometric feature token, and the service public key after signature verification on the registration request packet succeeds, to perform identity authentication on the user account.

The service client sends the registration request packet returned by the biometric authentication middleware to the service server. The service server forwards the registration request packet to the authentication server.

The authentication server sends the registration request packet to the biometric authentication center server. The biometric authentication center server extracts the device identity from the received registration request packet, searches an accessible network storage location for a device public key corresponding to the device identity, performs signature verification on the registration request packet by using the device public key, and sends a signature verification result to the authentication server.

If the signature verification fails, the authentication server rejects the registration request and informs the service server, and the service server notifies the service client of the registration failure result. If the signature verification succeeds, the authentication server saves the correspondence among the device identity, the virtual account identity, the biometric authentication type, the biometric feature token, and the service public key in the registration request packet.

The authentication server can return a registration response packet indicating successful registration to the service server, and the service server notifies the service client of the user equipment of the successful registration message. The authentication server can add the virtual account identity and the biometric authentication type in the correspondence, and the service account identity corresponding to the virtual account identity to the registration response packet, and the service server saves the correspondence among the service account identity, the virtual account identity, and the biometric authentication type in the registration response packet.

In an implementation, after receiving a registration information request packet, the authentication server can generate a virtual account identity and a registration verification code of the virtual account. A method for generating the registration verification code can be using various one-time password generation algorithms. This is not limited in the implementation. The authentication server encapsulates the virtual account identity, the server public key, and the generated registration verification code into a registration information response packet, sends the registration information response packet to the service server, and starts timing. When generating a registration request packet, the identity authentication detector of the user equipment also encapsulates the registration verification code in the registration information response packet into the registration request packet. The authentication server receives the registration request packet forwarded by the service server, compares the registration verification code in the registration request packet with the registration verification code generated for the virtual account in the registration request packet, and obtains the time difference between sending the registration information response packet and receiving the registration request packet. If the two registration verification codes are different or the time difference exceeds first predetermined duration, the authentication server rejects the registration request and informs the service server, and the service server notifies the service client of the registration failure result. If the two registration verification codes are the same and the time difference does not exceed the first predetermined duration, the authentication server saves the correspondence among the device identity, the virtual account identity, the biometric authentication type, the biometric feature token, and the service public key in the registration request packet.

Figure 4A:
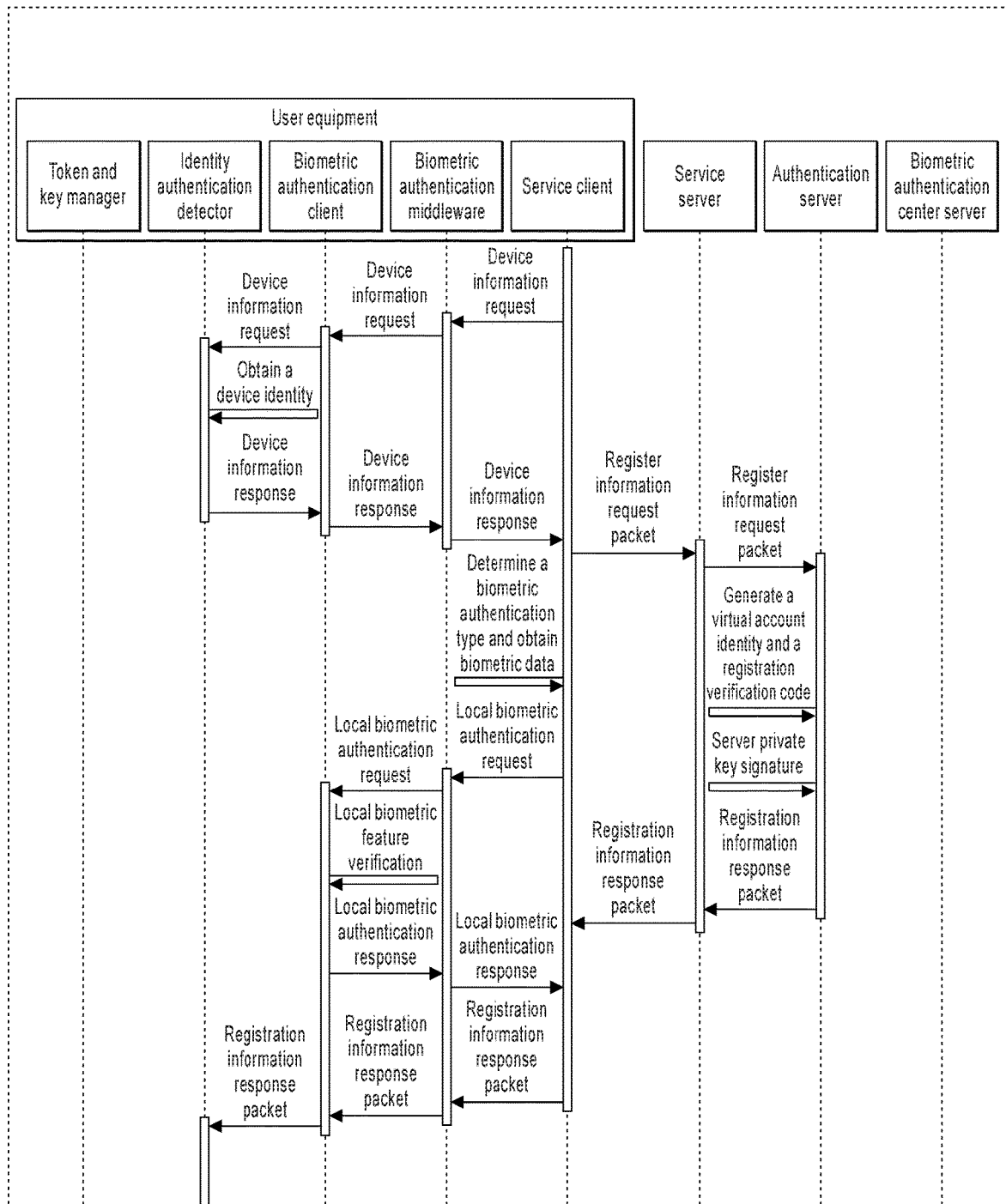
FIGS. 4A & 4B represent an interaction flowchart illustrating identity registration among user equipment, a service server, an authentication server, and a biometric authentication center server, according to Implementation 1 of the present application.
Figure 4B:
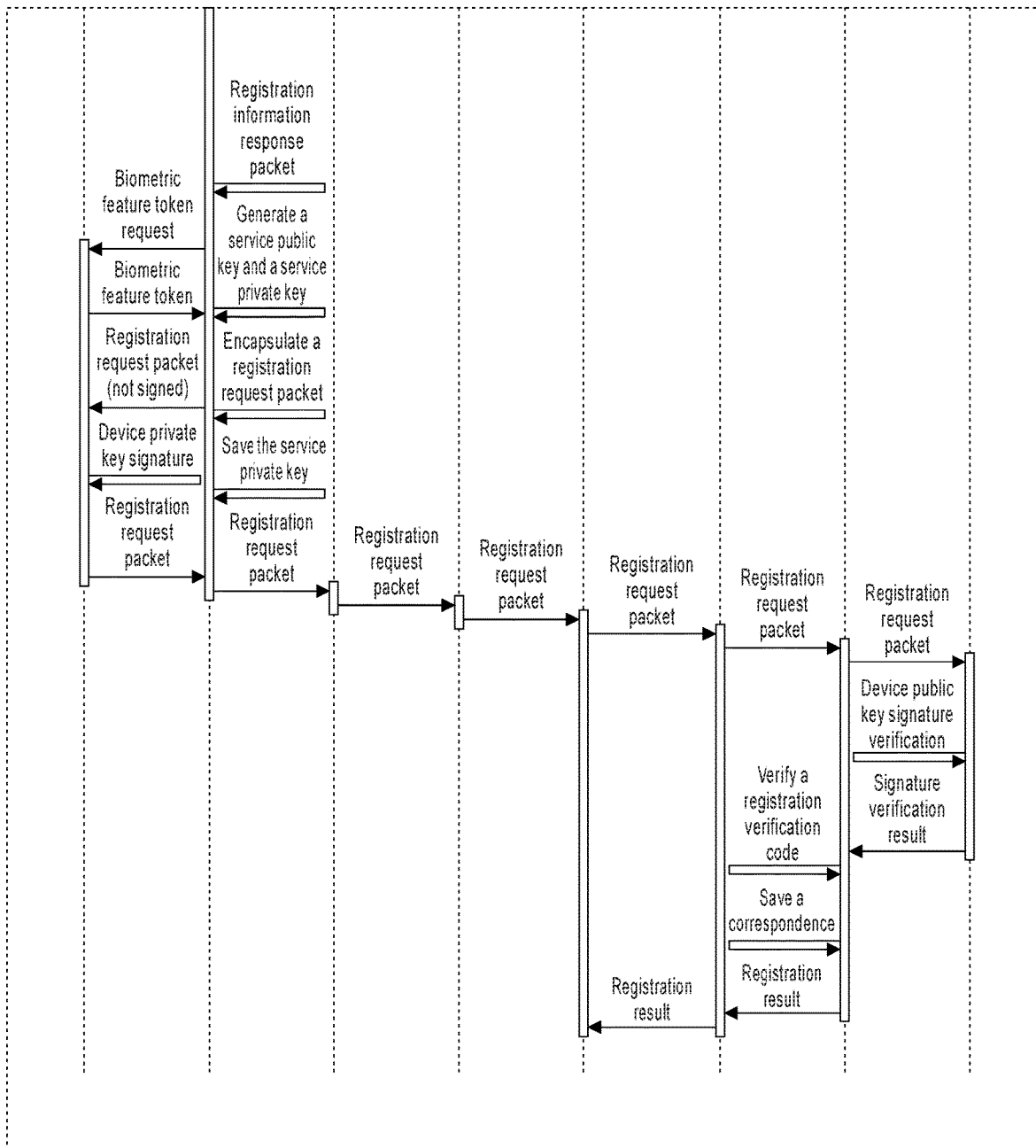

In an implementation including a registration verification code, an interaction process among various function modules of user equipment, a service server, an authentication server, and a biometric authentication center server is shown in FIGS. 4A & 4B.

In Implementation 1 of the present application, a device private key and a device public key pre-stored on the user equipment are used to ensure that the user equipment is a reliable device. A server public key and a server private key are used to verify reliability of the service server. As such, a correspondence among a device identity of the user equipment, a virtual account identity, a biometric authentication type, a biometric feature token, and a service public key can be securely registered in the authentication server for subsequent identity authentication, thereby improving identity registration security.

Figure 5:
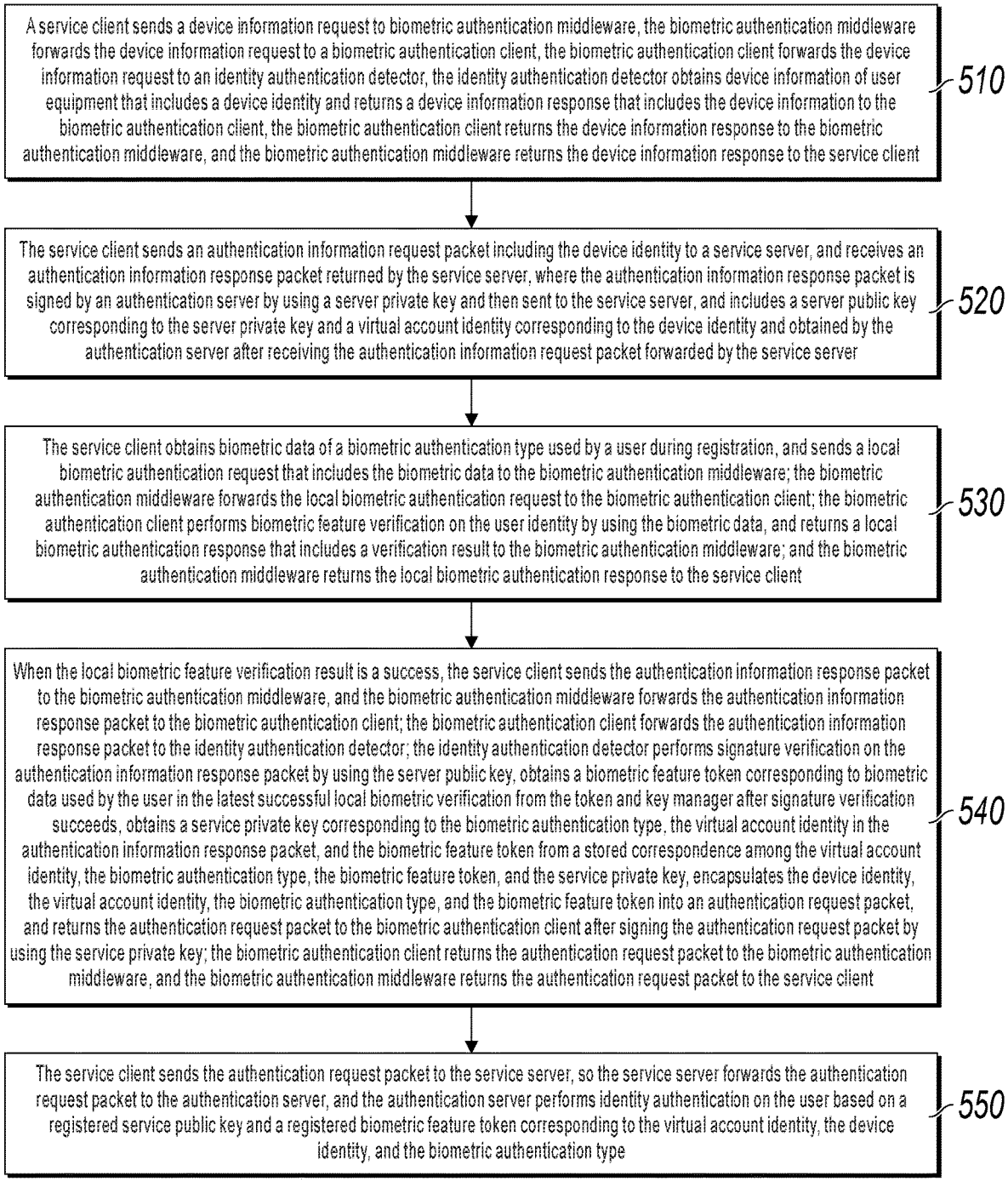
FIG. 5 is a flowchart illustrating a method for authenticating a biometric identity that applies to user equipment, according to Implementation 2 of the present application.
Figure 6:
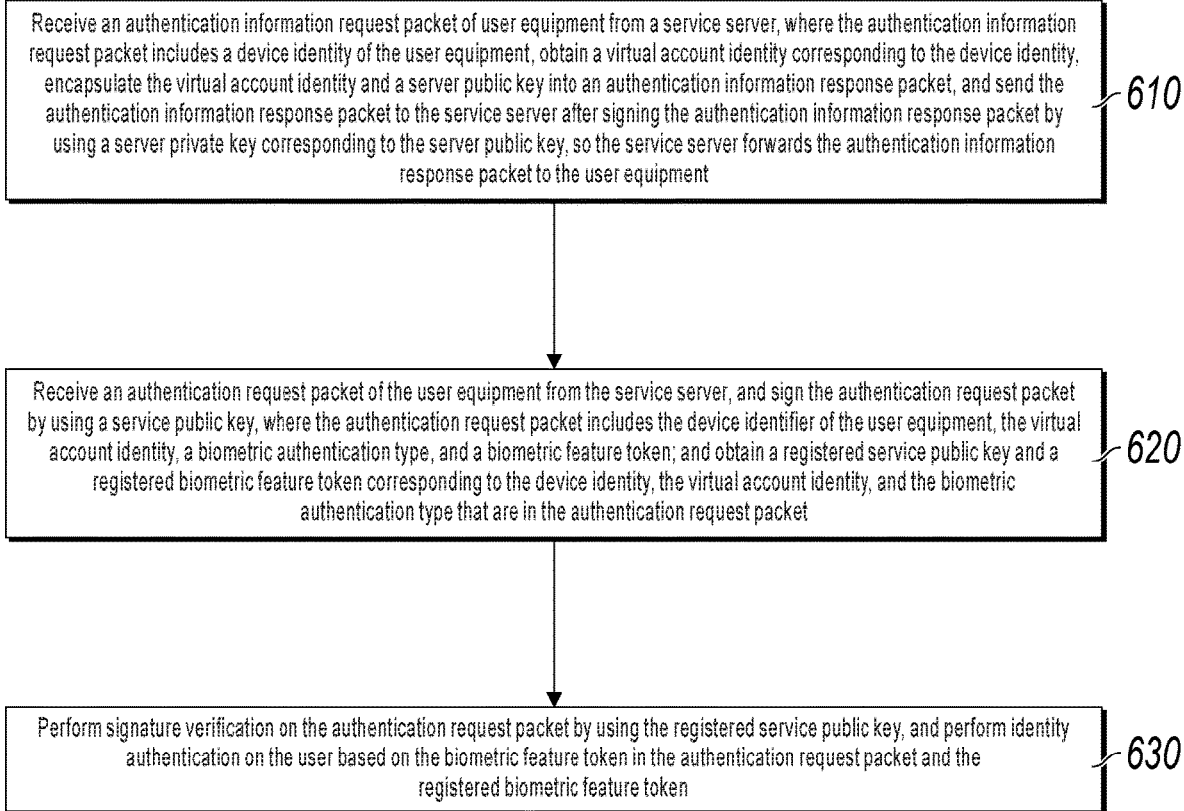
FIG. 6 is a flowchart illustrating a method for authenticating a biometric identity that applies to an authentication server, according to Implementation 2 of the present application.

Implementation 2 of the present application describes a method for authenticating a biometric identity. A process of applying the method to user equipment is shown in FIG. 5, and a process of applying the method to an authentication server is shown in FIG. 6. An identity authentication process in Implementation 2 uses the same technical means as the identity registration process in Implementation 1. The following describes only the difference between Implementation 2 and Implementation 1. For the same content, reference can be made to Implementation 1. Details are omitted here for simplicity.

On the user equipment, in step 510, the service client sends a device information request to the biometric authentication middleware, the biometric authentication middleware forwards the device information request to the biometric authentication client, the biometric authentication client forwards the device information request to the identity authentication detector, the identity authentication detector obtains device information of the user equipment that includes a device identity and returns a device information response that includes the device information to the biometric authentication client, the biometric authentication client returns the device information response to the biometric authentication middleware, and the biometric authentication middleware returns the device information response to the service client.

When the user initiates a process of authenticating a biometric identity on the service client of the user equipment, the service client initiates a device information request to the biometric authentication middleware, the biometric authentication middleware forwards the device information request to the biometric authentication client, and the biometric authentication client forwards the device information request to the identity authentication detector.

The device information of the user equipment obtained by the identity authentication detector includes the device identity, a device model, a manufacturer, etc. The identity authentication detector returns a device information response that includes the obtained device information to the biometric authentication client, the biometric authentication client returns the device information response to the biometric authentication middleware, and the biometric authentication middleware returns the device information response to the service client.

On the user equipment, in step 520, the service client sends an authentication information request packet including the device identity to a service server, and receives an authentication information response packet returned by the service server, where the authentication information response packet is signed by an authentication server by using a server private key and then sent to the service server, and includes a server public key corresponding to the server private key and a virtual account identity corresponding to the device identity and obtained by the authentication server after receiving the authentication information request packet forwarded by the service server.

On the authentication server, in step 610, receive the authentication information request packet of the user equipment from the service server, where the authentication information request packet includes the device identity of the user equipment; and obtain the virtual account identity corresponding to the device identity, encapsulate the virtual account identity and the server public key into an authentication information response packet, and send the authentication information response packet to the service server after signing the authentication information response packet by using the server private key corresponding to the server public key, so the service server forwards the authentication information response packet to the user equipment.

The service client of the user equipment sends an authentication information request packet to the service server, and the authentication information request packet includes the device identity of the user equipment. The authentication information request packet can further include the service account identity of the user. The service server forwards the authentication information request packet to the authentication server.

In the identity registration process of Implementation 1, the authentication server stores the correspondence among the device identity, the virtual account identity, the biometric authentication type, the biometric feature token, and the service public key locally or in another accessible network storage location. The stored device identity, virtual account identity, biometric authentication type, biometric feature token, and service public key are the registered device identity, the registered virtual account identity, the registered biometric authentication type, the registered biometric feature token, and the registered service public key in Implementation 2.

After receiving an authentication request packet forwarded by the service server, the authentication server extracts the device identity of the user equipment, searches for a registered virtual account identity corresponding to the device identity, encapsulates the found virtual account identity and the server public key into an authentication information response packet, and sends the authentication information response packet to the service server after signing the authentication information response packet by using the server private key corresponding to the server public key. The service server forwards the authentication information response packet to the user equipment.

On the user equipment, in step 530, the service client obtains biometric data of a biometric authentication type used by the user during registration, and sends a local biometric authentication request that includes the biometric data to the biometric authentication middleware; the biometric authentication middleware forwards the local biometric authentication request to the biometric authentication client; the biometric authentication client performs biometric feature verification on the user identity by using the biometric data, and returns a local biometric authentication response that includes a verification result to the biometric authentication middleware; and the biometric authentication middleware returns the local biometric authentication response to the service client.

Based on the biometric authentication type determined in the identity registration process, the service client requests and obtains the biometric data of the biometric authentication type provided by the user. The service client encapsulates the user's biometric data into the local biometric authentication request, and sends the local biometric authentication request to the biometric authentication middleware; the biometric authentication middleware sends the local biometric authentication request to the biometric authentication client.

The biometric authentication client performs biometric feature verification on the user identity by using the biometric data in the biometric authentication request. After the verification is completed, the biometric authentication client returns a local biometric authentication response including a verification result indicating whether verification succeeds to the biometric authentication middleware, and the biometric authentication middleware returns the local biometric authentication response to the service client.

On the user equipment, in step 540, when the local biometric feature verification result is a success, the service client sends the authentication information response packet to the biometric authentication middleware, and the biometric authentication middleware forwards the authentication information response packet to the biometric authentication client, The biometric authentication client forwards the authentication information response packet to the identity authentication detector. The identity authentication detector performs signature verification on the authentication information response packet by using the server public key, obtains a biometric feature token corresponding to biometric data used by the user in the latest successful local biometric verification from the token and key manager after signature verification succeeds, obtains a service private key corresponding to the biometric authentication type, the virtual account identity in the authentication information response packet, and the biometric feature token from a stored correspondence among the virtual account identity, the biometric authentication type, the biometric feature token, and the service private key, encapsulates the device identity, the virtual account identity, the biometric authentication type, and the biometric feature token into an authentication request packet, and returns the authentication request packet to the biometric authentication client after signing the authentication request packet by using the service private key. The biometric authentication client returns the authentication request packet to the biometric authentication middleware, and the biometric authentication middleware returns the authentication request packet to the service client.

The service client extracts the local biometric feature verification result from the local biometric authentication response returned by the biometric authentication middleware. If the result indicates a failure, the identity authentication process fails. When the local biometric feature verification result indicates a success, the service client sends the authentication information response packet to the biometric authentication middleware, the biometric authentication middleware forwards the authentication information response packet to the biometric authentication client, and the biometric authentication client forwards the authentication information response packet to the identity authentication detector.

The identity authentication detector extracts the server public key from the authentication information response packet, and performs signature verification on the authentication information response packet by using the server public key. If the signature verification fails, it indicates that the authentication information response packet is possibly not from a reliable authentication server, and the authentication process fails. After the signature verification succeeds, the identity authentication detector requests a biometric feature token from the token and key manager. The token and key manager returns the biometric feature token corresponding to the biometric data used by the user during the latest local biometric feature verification (namely, the biometric data obtained by the service client when performing local biometric feature verification in step 530) to the identity authentication detector.

The identity authentication detector encapsulates the device identity of the user equipment, the virtual account identity extracted from the authentication information response packet, the biometric authentication type used during the latest successful local biometric feature verification, and the biometric feature token returned by the token and key manager into the authentication request packet. The identity authentication detector finds the service private key corresponding to the biometric authentication type used during the latest successful local biometric feature verification, the virtual account identity in the authentication information response packet, and the biometric feature token returned by the token and key manager from the correspondence among the stored virtual account identity, biometric authentication type, biometric feature token, and service private key, and returns the authentication request packet to the biometric authentication client after signing the authentication request packet by using the service private key.

The biometric authentication client returns the authentication request packet to the biometric authentication middleware, and the biometric authentication middleware returns the authentication request packet to the service client.

On the user equipment, in step 550, the service client sends the authentication request packet to the service server, so the service server forwards the authentication request packet to the authentication server, and the authentication server performs identity authentication on the user based on a registered service public key and a registered biometric feature token corresponding to the virtual account identity, the device identity, and the biometric authentication type.

On the authentication server, in step 620, receive the authentication request packet of the user equipment from the service server, and sign the authentication request packet by using the service public key, where the authentication request packet includes the device identifier of the user equipment, the virtual account identity, the biometric authentication type, and the biometric feature token; and obtain the registered service public key and the registered biometric feature token corresponding to the device identity, the virtual account identity, and the biometric authentication type in the authentication request packet.

On the authentication server, in step 630, perform signature verification on the authentication request packet by using the registered service public key, and perform identity authentication on the user based on the biometric feature token in the authentication request packet and the registered biometric feature token.

The service client sends the authentication request packet returned by the biometric authentication middleware to the service server. The service server forwards the authentication request packet to the authentication server. The authentication server searches for a registered service public key and a registered biometric feature token corresponding to the virtual account identity, the device identity, and the biometric authentication type in the authentication request packet from the stored correspondence among the registered device identity, the registered virtual account identity, the registered biometric authentication type, the registered biometric feature token, and the registered service public key.

The authentication server compares the biometric feature token in the authentication request packet with the registered biometric feature token, and performs signature verification on the authentication request packet by using the registered service public key. If the two biometric feature tokens are different or the signature verification fails, the authentication server rejects the authentication request and informs the service server, and the service server notifies the service client of the authentication failure result. If the two biometric feature tokens are the same and the signature verification succeeds, the user passes identity authentication, and the authentication server returns an authentication response packet including the identity authentication success result to the service server. The service server can perform corresponding service processing based on the identity authentication success result, and notify the service client of the identity authentication success result and/or the service processing result.

In an implementation, the authentication server can generate an authentication verification code of a virtual account corresponding to a device identity in an authentication information request packet after receiving the authentication information request packet. The authentication server encapsulates a virtual account identity, a server public key, and the generated authentication verification code into an authentication information response packet, sends the authentication information response packet to the service server, and starts timing. When generating an authentication request packet, the identity authentication detector of the user equipment also encapsulates the authentication verification code in the authentication information response packet into the authentication request packet. The authentication server receives the authentication request packet forwarded by the service server, compares the authentication verification code in the authentication request packet with the authentication verification code generated for the virtual account in the authentication request packet, and obtains the time difference between sending the authentication information response packet and receiving the authentication request packet. If the two authentication verification codes are different or the time difference exceeds second predetermined duration, the authentication server rejects the authentication request and informs the service server, and the service server notifies the service client of the authentication failure result. If the two authentication verification codes are different, and the time difference does not exceed the second predetermined duration, the authentication server performs signature verification on the authentication request packet by using the registered service public key, and performs identity authentication on the user based on the biometric feature token in the authentication request packet and the registered biometric feature token.

Figure 7A:
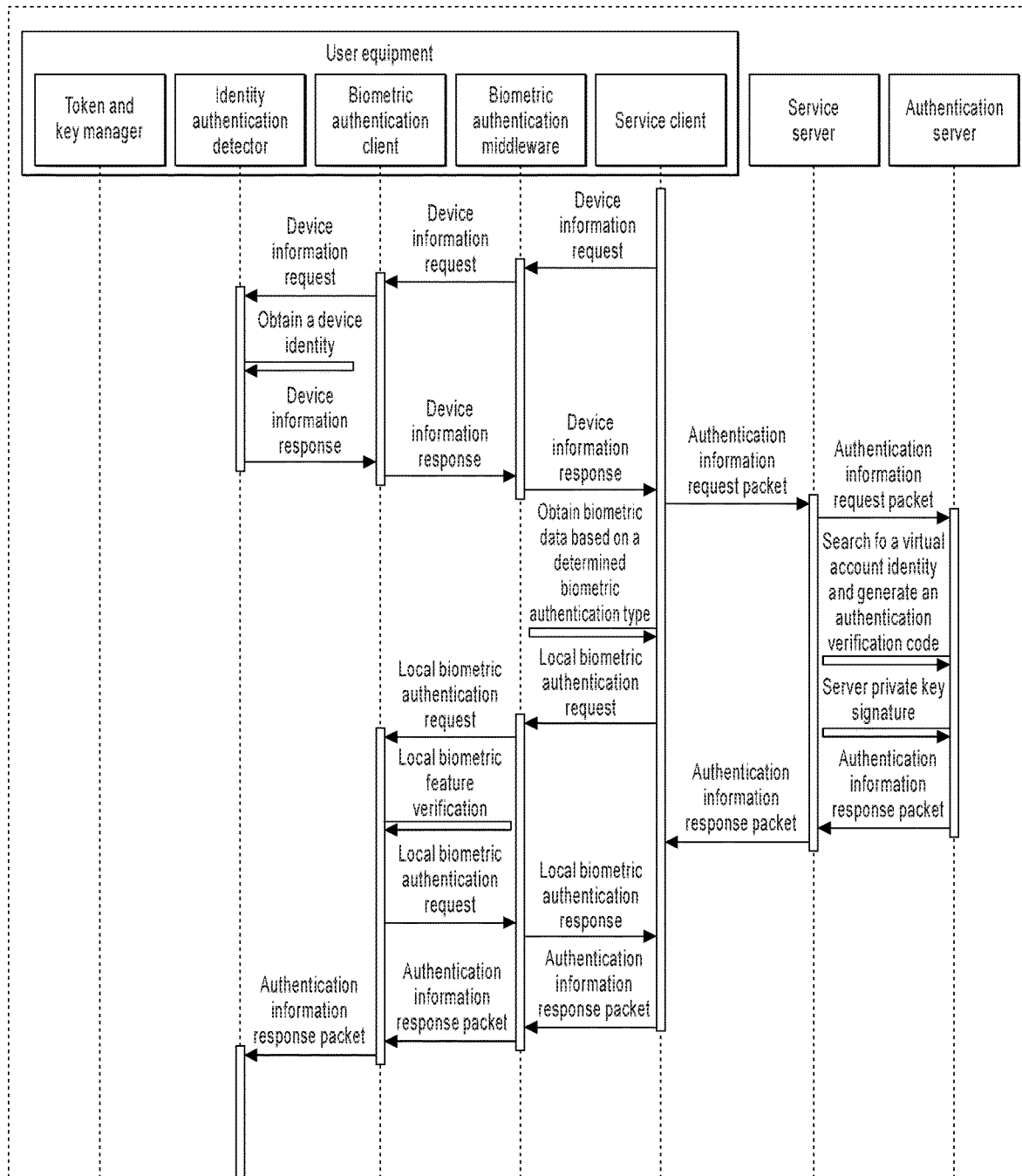
FIGS. 7A & 7B represent an interaction flowchart illustrating identity authentication among user equipment, a service server, and an authentication server, according to Implementation 2 of the present application.
Figure 7B:
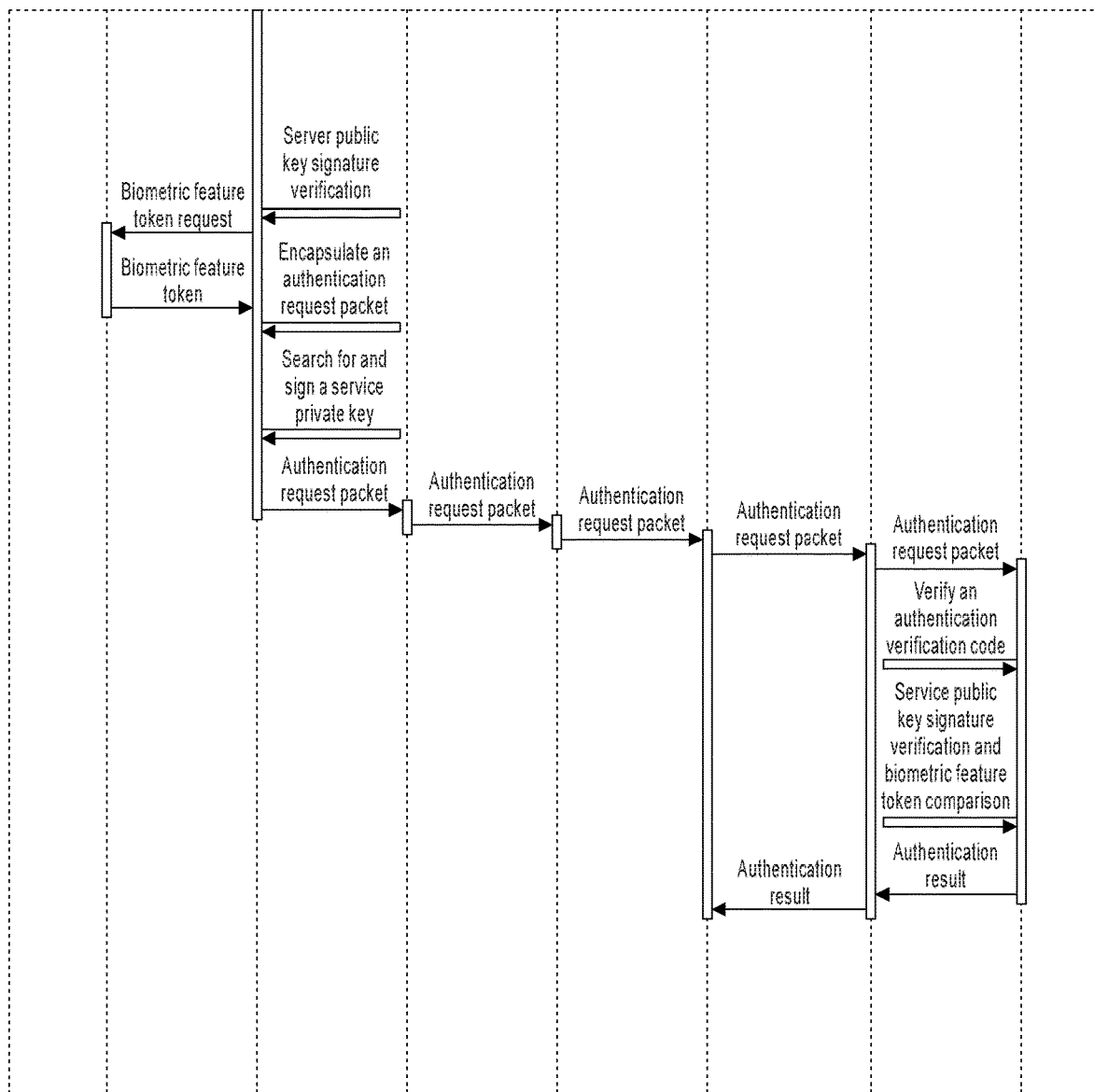

In an implementation including an authentication verification code, an interaction process among various function modules of user equipment, a service server, an authentication server, and a biometric authentication center server is shown in FIGS. 7A & 7B.

In Implementation 2 of the present application, a device private key and a device public key pre-stored on the user equipment are used to ensure that the user equipment is a reliable device. A server public key and a server private key are used to verify reliability of the service server. As such, a correspondence among a device identity of the user equipment, a virtual account identity, a biometric authentication type, a biometric feature token, and a service public key can be securely registered in the authentication server for subsequent identity authentication, thereby improving identity registration security.

In Implementation 2 of the present application, the server public key and the server private key are used to verify the service server, the service private key and the registered service public key are used to verify the user equipment, and the user equipment needs to provide a device identity, a virtual account identity, a biometric authentication type, and a biometric feature token matching the registered information to pass authentication, so the identity authentication process is highly secure.

In the previous two implementations, the identity authentication detector and the token and key manager can run in a secure environment of the user equipment, to improve registration and authentication security. For example, the identity authentication detector, the token and key manager, and another software module (e.g. process or thread) can run in isolation, and the other software module is not allowed to access their cache space (the two modules also run in isolation and are not allowed to access each other's cache space). For another example, the code and stored files of the identity authentication detector and the token and key manager are stored in the storage area of the user equipment that has the highest security level and strictest access control.

Figure 8:
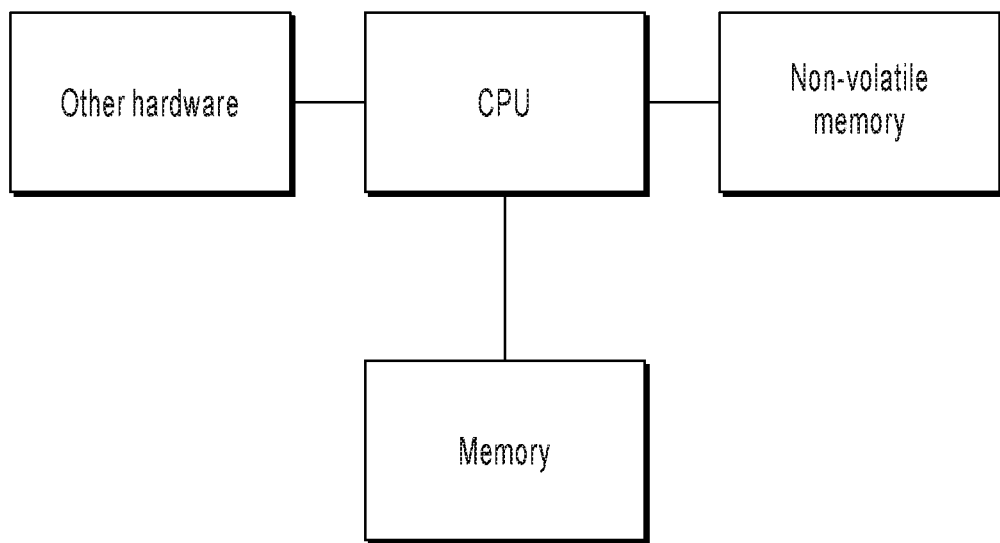
FIG. 8 is a diagram illustrating a hardware structure of user equipment or an authentication server.

Corresponding to the previous process implementations, an implementation of the present application further provides a device for registering a biometric identity, which is applied to user equipment; a device for registering a biometric identity, which is applied to an authentication server; a device for authenticating a biometric identity, which is applied to user equipment; a device for authenticating a biometric identity, which is applied to an authentication server. The devices can be implemented using software, hardware, or a combination of software and hardware. Taking software implementation as an example, a logical device is formed by a central processing unit (CPU) of the user equipment or the authentication server reading corresponding computer program instructions into a memory for running. From the perspective of hardware, in addition to the CPU, memory, and non-volatile memory shown in FIG. 8, the user equipment usually includes other hardware such as a chip for receiving and sending wireless signals, and the authentication server usually includes other hardware such as a board for implementing a network communication function.

Figure 9:
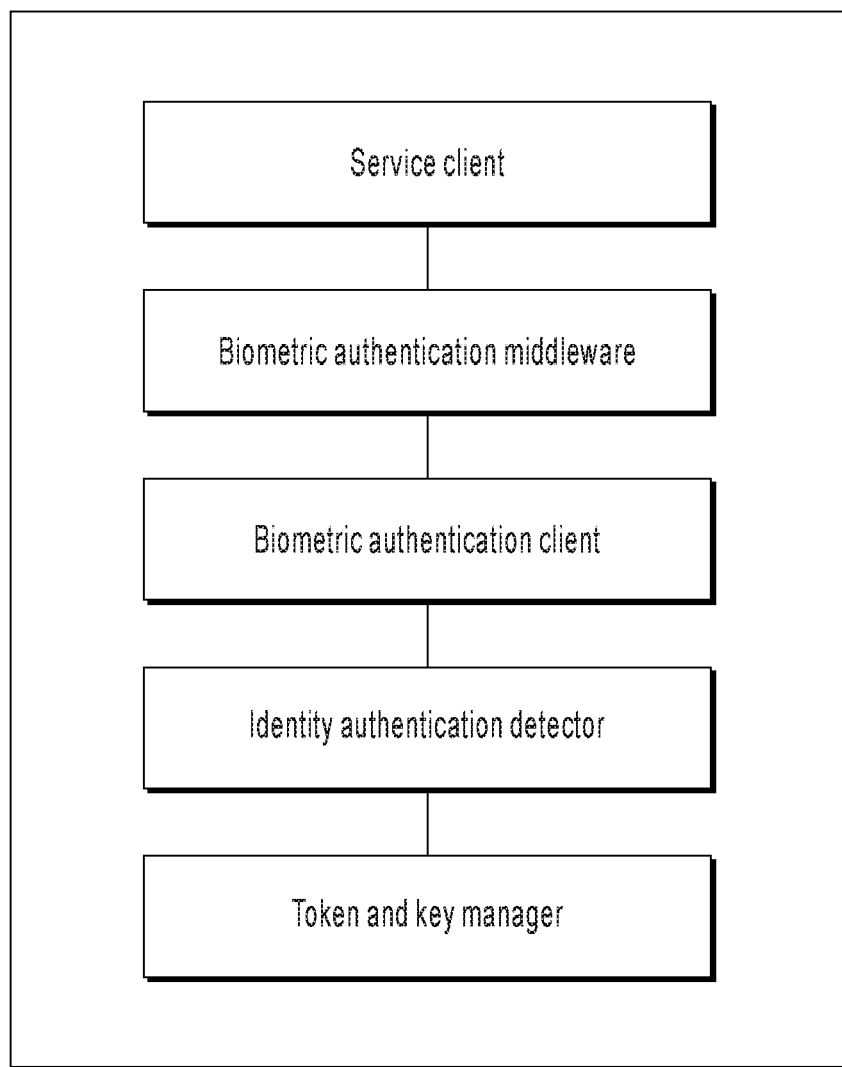
FIG. 9 is a diagram illustrating a logical structure of a device for registering a biometric identity that applies to user equipment or a device for authenticating a biometric identity that applies to user equipment, according to Implementation 1 of the present application.

FIG. 9 shows a device for registering a biometric identity according to an implementation of the present application. The device is applied to user equipment and includes a service client, biometric authentication middleware, a biometric authentication client, an identity authentication detector, and a token and key manager.

The service client is configured to send a device information request to biometric authentication middleware, and receive a device information response including a device identity and returned by the biometric authentication middleware; send a registration information request packet that includes a service account identity to a service server, and receive a registration information response packet returned by the service server, where the registration information response packet is signed by an authentication server by using a server private key and then sent to the service server, and includes a virtual account identity corresponding to the service account identity and generated by the authentication server after receiving the registration information request packet forwarded by the service server, and a server public key corresponding to the server private key; determine a biometric authentication type of the user, obtain the user's biometric data of the biometric authentication type, and send a local biometric authentication request that includes the biometric data to the biometric authentication middleware, and receive a local biometric authentication response including a local biometric verification result and returned by the biometric authentication middleware; when the local biometric feature verification result is a success, send the registration information response packet to the biometric authentication middleware, receive a registration request packet returned by the biometric authentication middleware, and sign the registration request packet by using a device private key of the user equipment, where the registration request packet includes the device identity, the virtual account identity, the biometric authentication type, a biometric feature token, and a service public key; send the registration request packet to the service server, so the service server forwards the registration request packet to the authentication server, and after a biometric authentication center server performs signature verification on the registration request packet by using a device public key of the user equipment, the authentication server saves a correspondence among the device identity, the virtual account identity, the biometric feature type, the biometric feature token, and the service public key, to perform identity authentication on the account.

The biometric authentication middleware is configured to receive a device information request from the service client, forward the device information request to a biometric authentication client, receive a device information response from the biometric authentication client, and forward the device information response to the service client; receive a local biometric authentication request from the service client, forward the local biometric authentication request to the biometric authentication client, receive a local biometric authentication response from the biometric authentication client, and forward the local biometric authentication response to the service client; and receive a registration information response packet from the service client, and forward the registration information response packet to the biometric authentication client, receive a registration request packet from the biometric authentication client, and forward the registration request packet to the service client.

The biometric authentication client is configured to receive a device information request from the biometric authentication middleware, forward the device information request to an identity authentication detector, receive a device information response from the identity authentication detector, and forward the device information response to the biometric authentication middleware; receive a local biometric authentication request form the biometric authentication middleware, perform biometric feature verification on the user identity by using biometric data in the local biometric authentication request, and return a local biometric authentication response that includes a verification result to the biometric authentication middleware; and receive a registration information response packet from the biometric authentication middleware, forward the registration information response packet to the identity authentication detector, receive a registration request packet from the identity authentication detector, and forward the registration request packet to the biometric authentication middleware.

The identity authentication detector is configured to obtain device information of the user equipment that includes the device identity after receiving a device information request forwarded by the biometric authentication client, and return a device information response that includes the device information to the biometric authentication client. After receiving a registration information response packet forwarded by the biometric authentication client, perform signature verification on the registration information response packet by using a server public key in the registration information response packet, obtain a biometric feature token corresponding to biometric data used by the user in the latest successful local biometric verification from a token and key manager after signature verification succeeds, generate a corresponding service public key and service private key, save a correspondence among the virtual account identity, the biometric authentication type, a biometric authentication token, and the service private key, encapsulate the device identity, the virtual account identity, the biometric authentication type, the biometric feature token, and the service public key into a registration request packet, and returns the registration request packet to the biometric authentication client after the token and key manager signs the registration request packet by using the device private key of the user equipment.

The token and key manager is configured to provide the identity authentication detector with the biometric feature token corresponding to the biometric data used by the user during the latest successful local biometric verification; and after receiving a registration request packet from the identity authentication detector, sign the registration request packet by using the stored device private key of the user equipment and then return the registration request packet to the identity authentication detector.

Optionally, the registration information response packet further includes a registration verification code of the virtual account generated by the authentication server. The registration request packet further includes the registration verification code, so after receiving the registration request packet, the authentication server verifies the registration request packet based on the registration verification code and a time interval between sending the registration information response packet and receiving the registration request packet.

Optionally, the identity authentication detector and the token and key manager run in a secure environment of the user equipment.

Figure 10:
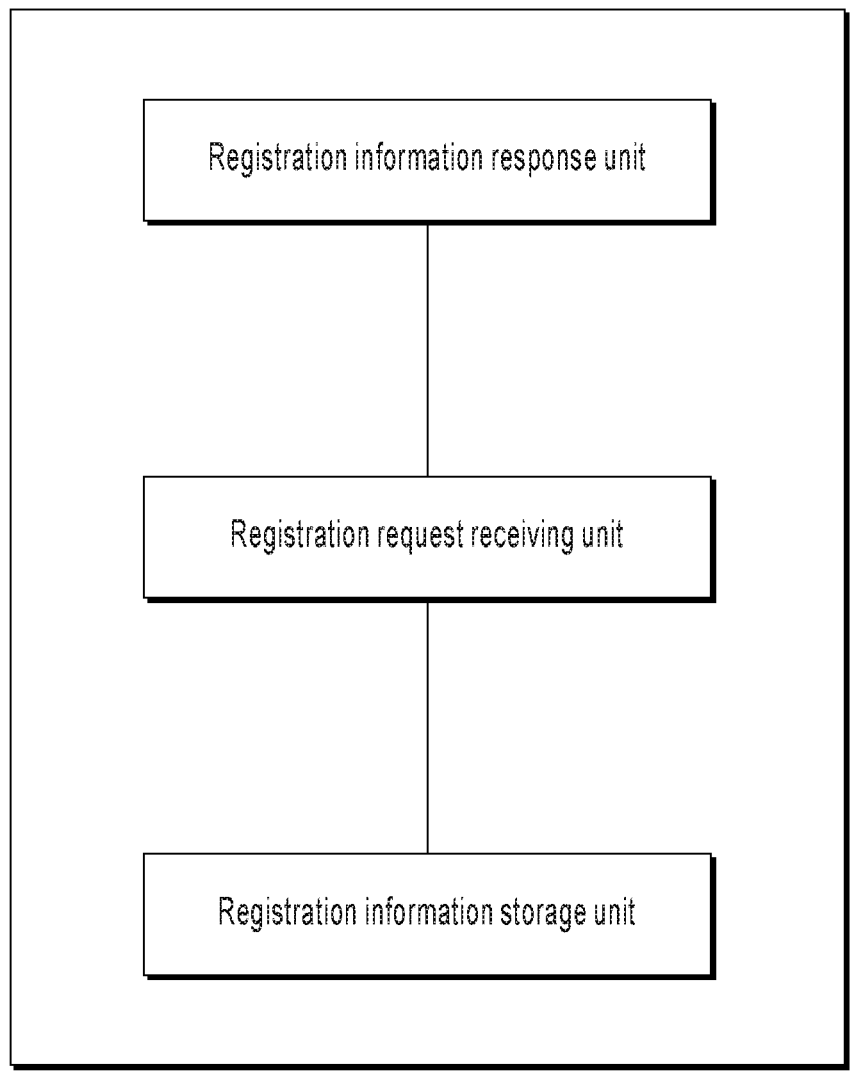
FIG. 10 is a diagram illustrating a logical structure of a device for registering a biometric identity that applies to an authentication server, according to Implementation 1 of the present application.

FIG. 10 shows a device for registering a biometric identity according to an implementation of the present application. The device is applied to an authentication server and includes a registration information response unit, a registration request receiving unit, and a registration information storage unit.

The registration information response unit is configured to receive a registration information request packet of user equipment from a service server, where the registration information request packet includes a service account identity, generate a virtual account identity corresponding to the service account identity, encapsulate the virtual account identity and a server public key into a registration information response packet, and send the registration information response packet to the service server after signing the registration information response packet by using a server private key corresponding to the server public key, so the service server forwards the registration information response packet to the user equipment.

The registration request receiving unit is configured to receive a registration request packet of the user equipment from the service server, where the registration request packet includes a device identity of the user equipment, the virtual account identity, a biometric authentication type, a biometric feature token, and a service public key, and wherein the registration request packet has been signed using a device encryption key of the user equipment; and send the registration request packet to a biometric authentication center server, and receive a signature verification result returned by the biometric authentication center server after performing signature verification on the registration request packet by using a device public key corresponding to the device identity.

The registration information storage unit is configured to save a correspondence among the device identity, the virtual account identity, the biometric authentication type, the biometric feature token, and the service public key after signature verification on the registration request packet succeeds, to perform identity authentication on the account.

Optionally, the device further includes a registration verification code generating unit, configured to generate a registration verification code of the virtual account. The registration information response packet further includes the generated registration verification code. The registration request packet further includes a registration verification code. The registration information storage unit is configured to save the correspondence among the device identity, the virtual account identity, the biometric authentication type, the biometric feature token, and the service public key after signature verification on the registration request packet succeeds, when the registration verification code in the registration request packet is the same as the registration verification code generated for the virtual account in the registration request packet, and a time interval between sending the registration information response packet and receiving the registration request packet is within first predetermined duration.

FIG. 9 shows a device for authenticating a biometric identity according to an implementation of the present application. The device is applied to user equipment and includes a service client, biometric authentication middleware, a biometric authentication client, an identity authentication detector, and a token and key manager.

The service client is configured to send a device information request to biometric authentication middleware, and receive a device information response including a device identity and returned by the biometric authentication middleware; send an authentication information request packet that includes the device identity to a service server, and receive an authentication information response packet returned by the service server, where the authentication information response packet is signed by an authentication server by using a server private key and then sent to the service server, and includes a server public key corresponding to the server private key and a virtual account identity corresponding to the device identity and obtained by the authentication server after receiving the authentication information request packet forwarded by the service server. Obtain biometric data of a biometric authentication type used by a user during registration, send a local biometric authentication request that includes the biometric data to the biometric authentication middleware, and receive a local biometric authentication response including a local biometric verification result and returned by the biometric authentication middleware. When the local biometric feature verification result is a success, send the authentication information response packet to the biometric authentication middleware, receive an authentication request packet returned by the biometric authentication middleware, and sign the authentication request packet by using a service private key, where the authentication request packet includes the device identity, the virtual account identity, the biometric authentication type, and a biometric feature token. Send the authentication request packet to the service server, so the service server forwards the authentication request packet to the authentication server, and the authentication server performs identity authentication on the user based on a registered service public key and a registered biometric feature token corresponding to the virtual account identity, the device identity, and the biometric authentication type.

The biometric authentication middleware is configured to receive a device information request from the service client, forward the device information request to a biometric authentication client, receive a device information response from the biometric authentication client, and forward the device information response to the service client; receive a local biometric authentication request from the service client, forward the local biometric authentication request to the biometric authentication client, receive a local biometric authentication response from the biometric authentication client, and forward the local biometric authentication response to the service client; and receive an authentication information response packet from the service client, forward the authentication information response packet to the biometric authentication client, receive an authentication request packet from the biometric authentication client, and forward the authentication request packet to the service client.

The biometric authentication client is configured to receive a device information request from the biometric authentication middleware, forward the device information request to an identity authentication detector, receive a device information response from the identity authentication detector, and forward the device information response to the biometric authentication middleware; receive a local biometric authentication request form the biometric authentication middleware, perform biometric feature verification on the user identity by using biometric data in the local biometric authentication request, and return a local biometric authentication response that includes a verification result to the biometric authentication middleware; and receive an authentication information response packet from the biometric authentication middleware, forward the authentication information response packet to the identity authentication detector, receive an authentication request packet from the identity authentication detector, and forward the authentication request packet to the biometric authentication middleware.

The identity authentication detector is configured to obtain device information of the user equipment that includes the device identity, and return a device information response that includes the device information to the biometric authentication client after receiving a device information request forwarded by the biometric authentication client; after receiving an authentication information response packet forwarded by the biometric authentication client, perform signature verification on the authentication information response packet by using a server public key in the authentication information response packet, obtain a biometric feature token corresponding to biometric data used by the user during the latest successful local biometric verification from a token and key manager after signature verification succeeds, obtain a service private key corresponding to the biometric authentication type, the virtual account identity in the authentication information response packet, and the biometric feature token from a stored correspondence among the virtual account identity, the biometric authentication type, the biometric feature token, and the service private key, encapsulate the device identity, the virtual account identity, the biometric authentication type, and the biometric feature token into an authentication request packet, and return the authentication request packet to the biometric authentication client after signing the authentication request packet by using the service private key.

The token and key manager is configured to provide the identity authentication detector with the biometric feature token corresponding to the biometric data used by the user during the latest successful local biometric verification.

Optionally, the authentication information response packet further includes an authentication verification code of the virtual account generated by the authentication server. The authentication request packet further includes the authentication verification code encapsulated by the identity authentication detector, so after receiving the authentication request packet, the authentication server verifies the authentication request packet based on the authentication verification code and a time interval between sending the authentication information response packet and receiving the authentication request packet.

Optionally, the identity authentication detector and the token and key manager run in a secure environment of the user equipment.

Figure 11:
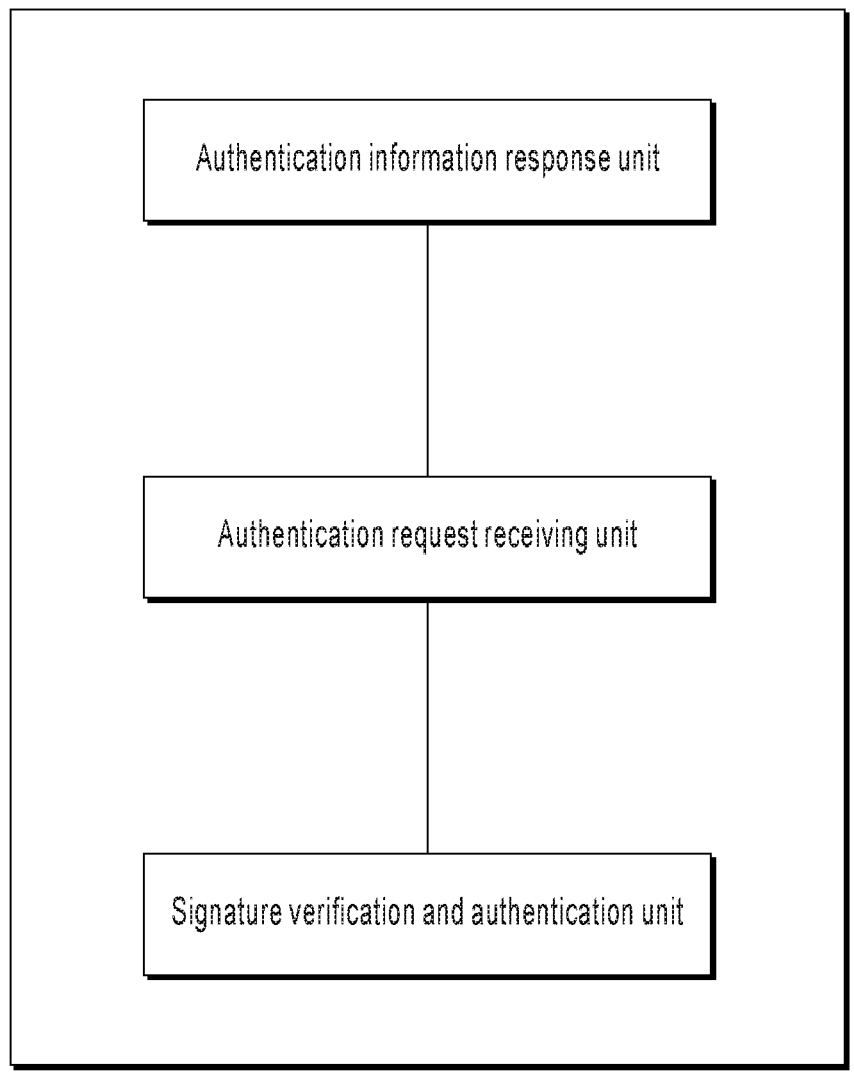
FIG. 11 is a diagram illustrating a logical structure of a device for authenticating a biometric identity that applies to an authentication server, according to Implementation 1 of the present application.

FIG. 11 shows a device for authenticating a biometric identity according to an implementation of the present application. The device is applied to an authentication server and includes an authentication information response unit, an authentication request receiving unit, and a signature verification and authentication unit.

The authentication information response unit is configured to receive an authentication information request packet of user equipment from a service server, where the authentication information request packet includes a device identity of the user equipment, obtain a virtual account identity corresponding to the device identity, encapsulate the virtual account identity and a server public key into an authentication information response packet, and send the authentication information response packet to the service server after signing the authentication information response packet by using a server private key corresponding to the server public key, so the service server forwards the authentication information response packet to the user equipment.

The authentication request receiving unit is configured to receive an authentication request packet of the user equipment from the service server, and sign the authentication request packet by using a service public key, where the authentication request packet includes the device identifier of the user equipment, the virtual account identity, a biometric authentication type, and a biometric feature token; and obtaining a registered biometric feature token and a registered service public key corresponding to the device identity, the virtual account identity, and the biometric authentication type that are in the authentication request packet.

The signature verification and authentication unit is configured to perform signature verification on the authentication request packet by using the registered service public key, and perform identity authentication on the user based on the biometric feature token in the authentication request packet and the registered biometric feature token.

Optionally, the device further includes an authentication verification code generating unit, configured to generate an authentication verification code of the virtual account. The authentication information response packet further includes the generated authentication verification code. The authentication request packet further includes an authentication verification code. The signature verification and authentication unit is configured to perform signature verification on the authentication request packet by using the registered service public key, and perform identity authentication on the user based on the biometric feature token in the authentication request packet and the registered biometric feature token, when the authentication verification code in the authentication request packet is the same as the authentication verification code generated for the virtual account in the authentication request packet, and a time interval between sending the authentication information response packet and receiving the authentication request packet is within second predetermined duration.

The previous descriptions are merely exemplary implementations of the present application, and are not intended to limit the present application. Any modification, equivalent replacement, and improvement made in the spirit and principle of the present application shall fall within the protection scope of the present application.

In a typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a parameter random access memory (PRAM), a static random access memory (SRAM), a dynamic random access memory (DRAM), another type of random access memory (RAM), a read-only memory (ROM), an electrically erasable programmable read only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. Based on the definition in the present specification, the computer readable medium does not include a transitory computer-readable media (transitory media), for example, a modulated data signal and carrier.

It is worthwhile to further note that in the present specification, the terms "include", "comprise", or their any other variant is intended to cover a non-exclusive inclusion, so a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

Figure 12:
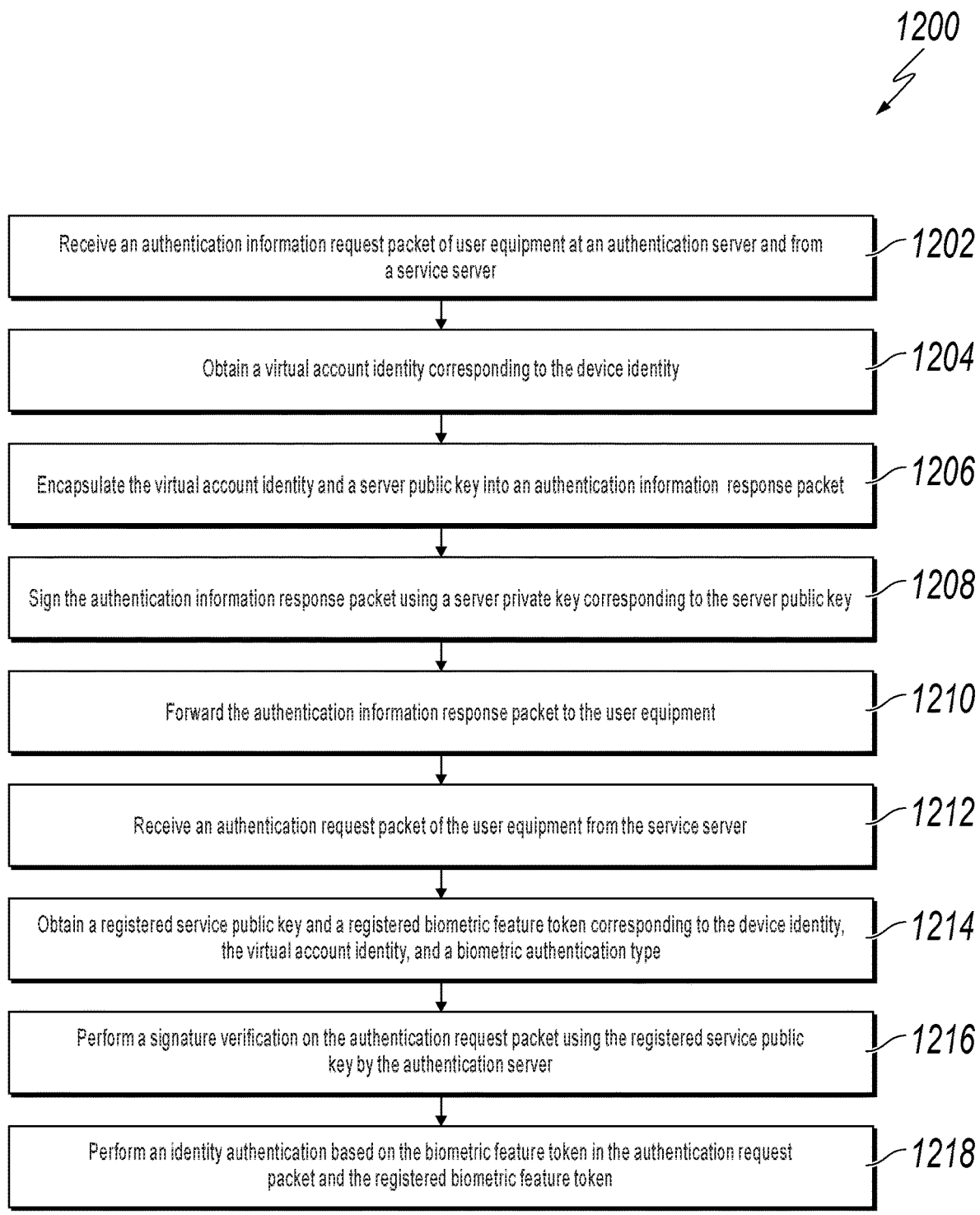
FIG. 12 is a flowchart illustrating an example of a computer-implemented method for registering and authenticating a biometric identity of a user according to an implementation of the present disclosure.

FIG. 12 is a flowchart illustrating an example of a computer-implemented method 1200 for registering and authenticating a biometric identity of a user, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, an authentication request packet of user equipment is received at an authentication server from a service server, where the user equipment is registered with the authentication server during a registration process. From 1202, method 1200 proceeds to 1204.

At 1204, a virtual account identity corresponding to the device identity is obtained. From 1204, method 1200 proceeds to 1206.

At 1206, the virtual account identity and a server public key are encapsulated into an authentication information response packet. From 1204, method 1200 proceeds to 1206.

At 1208, the authentication information response packet is signed using a server private key corresponding to the server public key. From 1208, method 1200 proceeds to 1210.

At 1210, the information response packet to the user equipment is forwarded to the user equipment. In some implementations, the authentication information response packet is transmitted to the service server. In some implementations, the authentication information response packet is transmitted from the service server to the user equipment. From 1210, method 1200 proceeds to 1212.

At 1212, an authentication request packet of the user equipment is received from the service server, wherein the authentication request packet includes the device identifier of the user equipment, the virtual account identity, and a biometric feature token.

In some implementations, after receiving the authentication request packet, the authentication server verifies the authentication request packet based on an authentication verification code and a time interval between the transmission of the authentication information response packet and receiving the authentication request packet. From 1212, method 1200 proceeds to 1214.

At 1214, a registered service public key and a registered biometric feature token corresponding to the device identity, the virtual account identity, and a biometric authentication type are obtained. In some implementations, the authentication request packet is signed using the service public key. From 1204, method 1214 proceeds to 1216.

At 1216, a signature verification is performed on the authentication request packet using the registered service public key by the authentication server. From 1216, method 1200 proceeds to 1218.

At 1218, an identity authentication is performed based on the biometric feature token in the authentication request packet and the registered biometric feature token. In some implementations, performing the identity authentication comprises performing a comparison of the biometric feature token included in the authentication request packet and the registered biometric feature token.

In some implementations, a biometric identity of a user is authenticated if the signature verification succeeds, and if the biometric feature token and the registered biometric feature token are determined to be identical. After 1218, method 1200 stops.

Implementations of the subject matter described in this specification can implemented so as to realize particular advantages or technical effects. For example, biometric data of a user is collected by user equipment, and traditionally, biometric identification can be performed on a server. Because a large amount of network traffic is usually consumed when image or video data is uploaded to a server, traditional biometric authentication methods have disadvantages, such as low efficiency and inadequate security. Implementations of the present application provide computer-implemented methods and computer-implemented systems for improving efficiency and security of biometric identity authentication by implementing biometric identification process on the user equipment. From a data security standpoint, reliability of the user equipment is enhanced by implementing a private key or certification mechanism in the user equipment. Additionally, a multi-level security structure is provided for a service client to select.

Based on the technical solutions provided in the above-described implementations, a device private key and a device public key pre-stored on the user equipment are used to ensure that the user equipment is a reliable device. A server public key and a server private key are used to verify reliability of the service server. As such, a correspondence among a device identity of the user equipment, a virtual account identity, a biometric authentication type, a biometric feature token, and a service public key can be securely registered in the authentication server for subsequent identity authentication, thereby improving identity registration security. Additionally, the server public key and the server private key can be used to verify the service server, the service private key and the registered service public key are used to verify the user equipment, and the user equipment provides a device identity, a virtual account identity, a biometric authentication type, and a biometric feature token matching the registered information to pass authentication. Accordingly, identity authentication process is highly-secure.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, at an authentication server and from a service server, a first authentication information request packet of a user equipment, wherein the first authentication information request packet includes a device identity of the user equipment;
obtaining, by the authentication server, a registered virtual account identity corresponding to the device identity;
encapsulating, by the authentication server, the registered virtual account identity into an authentication information response packet;
signing, by the authentication server, the authentication information response packet using an authentication server private key;

forwarding, by the authentication server through the service server, the authentication information response packet to the user equipment;

performing, by the user equipment, a first signature verification on the authentication information response packet using a registered authentication server public key, wherein the registered authentication server public key corresponds to the authentication server private key;

in response to a successful first signature verification, receiving, by the authentication server, from the user equipment through the service server, a second authentication request packet signed by the user equipment using a user equipment private key, wherein the second authentication request packet includes the device identity of the user equipment, the registered virtual account identity, and a biometric feature token, and wherein the second authentication request packet originates at the user equipment and provided to the authentication server through the service server;

verifying, by the authentication server, the second authentication request packet based on an authentication verification code and a time interval between the forwarding of the authentication information response packet and receiving the second authentication request packet;

obtaining, by the authentication server, a registered user equipment public key that corresponds to the user equipment private key and a registered biometric feature token corresponding to the device identity, the registered virtual account identity, and a biometric authentication type;

performing, by the authentication server, a second signature verification on the second authentication request packet using the registered user equipment public key; and performing, by the authentication server, an identity authentication based on the biometric feature token in the second authentication request packet and the registered biometric feature token.

2. The computer-implemented method of claim 1, wherein performing the identity authentication comprises performing a comparison of the biometric feature token included in the second authentication request packet and the registered biometric feature token.

3. The computer-implemented method of claim 1, wherein a biometric identity of a user of the user equipment is authenticated if the second signature verification succeeds, and if the biometric feature token and the registered biometric feature token are determined to be identical.

4. The computer-implemented method of claim 1, further comprising:

in response to an unsuccessful first signature verification, determining, by the user equipment, that the authentication server is not reliable.

5. The computer-implemented method of claim 1, further comprising:

in response to an unsuccessful second signature verification, or in response to determining that the biometric feature token and the registered biometric feature token are different, determining, by the authentication server, the user equipment is not authenticated; and sending, from the authentication server to the user equipment through the service server, an authentication failure result.

6. The computer-implemented method of claim 1, further comprising:

determining, by the authentication server, that a biometric identity of a user of the user equipment is authenticated; and sending, from the authentication server to the service server, a third authentication response packet, wherein the third authentication response packet comprises an identity authentication success result.

7. A non-transitory, computer-readable medium storing one or more instructions executable by a computer system to perform operations comprising:

receiving, at an authentication server and from a service server, a first authentication information request packet of a user equipment, wherein the first authentication information request packet includes a device identity of the user equipment;

obtaining, by the authentication server, a registered virtual account identity corresponding to the device identity;

encapsulating, by the authentication server, the registered virtual account identity into an authentication information response packet;

signing, by the authentication server, the authentication information response packet using an authentication server private key;

forwarding, by the authentication server through the service server, the authentication information response packet to the user equipment;

performing, by the user equipment, a first signature verification on the authentication information response packet using a registered authentication server public key, wherein the registered authentication server public key corresponds to the authentication server private key;

in response to a successful first signature verification, receiving, by the authentication server, from the user equipment through the service server, a second authentication request packet signed by the user equipment using a user equipment private key, wherein the second authentication request packet includes the device identity of the user equipment, the registered virtual account identity, and a biometric feature token, and wherein the second authentication request packet originates at the user equipment and provided to the authentication server through the service server;

verifying, by the authentication server, the second authentication request packet based on an authentication verification code and a time interval between the forwarding of the authentication information response packet and receiving the second authentication request packet;

obtaining, by the authentication server, a registered user equipment public key that corresponds to the user equipment private key and a registered biometric feature token corresponding to the device identity, the registered virtual account identity, and a biometric authentication type;

performing, by the authentication server, a second signature verification on the second authentication request packet using the registered user equipment public key; and performing, by the authentication server, an identity authentication based on the biometric feature token in the second authentication request packet and the registered biometric feature token.

8. The non-transitory, computer-readable medium of claim 7, wherein performing the identity authentication comprises performing a comparison of the biometric feature token included in the second authentication request packet and the registered biometric feature token.

9. The non-transitory, computer-readable medium of claim 7, wherein a biometric identity of a user of the user equipment is authenticated if the second signature verification succeeds, and if the biometric feature token and the registered biometric feature token are determined to be identical.

10. The non-transitory, computer-readable medium of claim 7, the operations further comprises:
in response to an unsuccessful first signature verification, determining, by the user equipment, that the authentication server is not reliable.

11. The non-transitory, computer-readable medium of claim 7, the operations further comprises:
in response to an unsuccessful second signature verification, or in response to determining that the biometric feature token and the registered biometric feature token are different, determining, by the authentication server, the user equipment is not authenticated; and
sending, from the authentication server to the user equipment through the service server, an authentication failure result.

12. The non-transitory, computer-readable medium of claim 7, the operations further comprises:
determining, by the authentication server, that a biometric identity of a user of the user equipment is authenticated; and
sending, from the authentication server to the service server, a third authentication response packet, wherein the third authentication response packet comprises an identity authentication success result.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at an authentication server and from a service server, a first authentication information request packet of a user equipment, wherein the first authentication information request packet includes a device identity of the user equipment;
obtaining, by the authentication server, a registered virtual account identity corresponding to the device identity;
encapsulating, by the authentication server, the registered virtual account identity into an authentication information response packet;
signing, by the authentication server, the authentication information response packet using an authentication server private key;
forwarding, by the authentication server through the service server, the authentication information response packet to the user equipment;
performing, by the user equipment, a first signature verification on the authentication information response packet using a registered authentication server public key, wherein the registered authentication server public key corresponds to the authentication server private key;
in response to a successful first signature verification, receiving, by the authentication server, from the user equipment through the service server, a second authentication request packet signed by the user equipment using a user equipment private key, wherein the second authentication request packet includes the device identity of the user equipment, the registered virtual account identity, and a biometric feature token, and wherein the second authentication request packet originates at the user equipment and provided to the authentication server through the service server;
verifying, by the authentication server, the second authentication request packet based on an authentication verification code and a time interval between the forwarding of the authentication information response packet and receiving the second authentication request packet;
obtaining, by the authentication server, a registered user equipment public key that corresponds to the user equipment private key and a registered biometric feature token corresponding to the device identity, the registered virtual account identity, and a biometric authentication type;
performing, by the authentication server, a second signature verification on the second authentication request packet using the registered user equipment public key; and
performing, by the authentication server, an identity authentication based on the biometric feature token in the second authentication request packet and the registered biometric feature token.

14. The computer-implemented system of claim 13, wherein performing the identity authentication comprises performing a comparison of the biometric feature token included in the second authentication request packet and the registered biometric feature token.

15. The computer-implemented system of claim 13, the operations further comprises:
in response to an unsuccessful first signature verification, determining, by the user equipment, that the authentication server is not reliable.

16. The computer-implemented system of claim 13, the operations further comprises:
in response to an unsuccessful second signature verification, or in response to determining that the biometric feature token and the registered biometric feature token are different, determining, by the authentication server, the user equipment is not authenticated; and
sending, from the authentication server to the user equipment through the service server, an authentication failure result.

17. The computer-implemented system of claim 13, the operations further comprises:
determining, by the authentication server, that a biometric identity of a user of the user equipment is authenticated; and
sending, from the authentication server to the service server, a third authentication response packet, wherein the third authentication response packet comprises an identity authentication success result.

* * * * *